United States Patent
Tanabe

(10) Patent No.: US 9,062,976 B2
(45) Date of Patent: Jun. 23, 2015

(54) PORTABLE ELECTRONIC DEVICE INCLUDING A PEDOMETER FUNCTION WITH SUPPRESSION OF COUNTING ERRORS

(75) Inventor: Shigeki Tanabe, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 277 days.

(21) Appl. No.: 13/056,502

(22) PCT Filed: Jul. 29, 2009

(86) PCT No.: PCT/JP2009/063487
§ 371 (c)(1),
(2), (4) Date: Jan. 28, 2011

(87) PCT Pub. No.: WO2010/013745
PCT Pub. Date: Feb. 4, 2010

(65) Prior Publication Data
US 2011/0177848 A1    Jul. 21, 2011

(30) Foreign Application Priority Data

Jul. 29, 2008  (JP) ................................. 2008-195405
Aug. 27, 2008 (JP) ................................. 2008-218497
Sep. 26, 2008 (JP) ................................. 2008-249135

(51) Int. Cl.
G01C 22/00      (2006.01)

(52) U.S. Cl.
CPC ......... *G01C 22/006* (2013.01); *H04M 2250/12* (2013.01)

(58) Field of Classification Search
CPC ..................... G01C 22/006; A61B 2562/0219; A61B 5/681; A61B 5/1118
USPC .......................................... 702/160; 455/418
See application file for complete search history.

(56) References Cited

U.S. PATENT DOCUMENTS

| 4,962,469 | A   |    | 10/1990 | Ono et al. |
| 7,297,088 | B2  | *  | 11/2007 | Tsuji ................................ 482/3 |
| 7,512,517 | B2  | *  | 3/2009  | Tsubata ........................ 702/160 |
| 7,526,404 | B2  | *  | 4/2009  | Ihashi ........................... 702/160 |
| 7,652,609 | B2  | *  | 1/2010  | Kim et al. |

(Continued)

FOREIGN PATENT DOCUMENTS

| JP | 2-612 U     | 1/1990 |
| JP | H06-2097 Y2 | 1/1994 |

(Continued)

OTHER PUBLICATIONS

Hiroshi, Shimizu; "Biological information measurement device" Aug. 30, 2007; JP 2007-215869; Machine Translation Japanese to English.*

(Continued)

*Primary Examiner* — Liton Miah
(74) *Attorney, Agent, or Firm* — Hoffmann & Baron, LLP

(57) ABSTRACT

Provided is a portable electronic device that has a pedometer function wherein generation of counting errors has been suppressed. The portable electronic device is provided with a housing, an acceleration-detecting unit that is mounted in the housing, a counting unit that counts the number of steps based on temporal changes in acceleration detected by the acceleration-detecting unit, and a correcting unit that corrects the number of steps counted by the counting unit.

13 Claims, 22 Drawing Sheets

(56) References Cited

U.S. PATENT DOCUMENTS

| | | | |
|---|---|---|---|
| 7,725,289 B2 * | 5/2010 | Nagashima et al. | 702/160 |
| 7,747,411 B2 * | 6/2010 | Kato | 702/160 |
| 7,877,226 B2 * | 1/2011 | Chan et al. | 702/160 |
| 2007/0143068 A1 * | 6/2007 | Pasolini et al. | 702/160 |
| 2007/0143069 A1 | 6/2007 | Pasolini et al. | |
| 2008/0004834 A1 * | 1/2008 | Sugai | 702/160 |
| 2008/0056429 A1 * | 3/2008 | Tsubata | 377/24.2 |
| 2008/0077353 A1 * | 3/2008 | Tsubata | 702/160 |
| 2008/0077354 A1 * | 3/2008 | Ihashi | 702/160 |
| 2008/0114565 A1 * | 5/2008 | Kato | 702/160 |
| 2009/0018797 A1 * | 1/2009 | Kasama et al. | 702/160 |
| 2009/0144020 A1 * | 6/2009 | Ohta et al. | 702/160 |

FOREIGN PATENT DOCUMENTS

| | | |
|---|---|---|
| JP | 2581764 B2 | 11/1996 |
| JP | 2000-227342 A | 8/2000 |
| JP | 2001-231067 A | 8/2001 |
| JP | 2003-30775 A | 1/2003 |
| JP | 2005-063288 A | 3/2005 |
| JP | 2005-167758 A | 6/2005 |
| JP | 2005-204916 A | 8/2005 |
| JP | 2005-286809 A | 10/2005 |
| JP | 2005-291890 A | 10/2005 |
| JP | 2006-5737 A | 1/2006 |
| JP | 2006-153795 A | 6/2006 |
| JP | 2007-215869 | 8/2007 |
| JP | 2008-198051 | 8/2008 |
| JP | 2009-123034 A | 6/2009 |
| JP | 2009-187068 A | 8/2009 |
| JP | 2010-9498 A | 1/2010 |
| JP | 2010-28674 A | 2/2010 |
| WO | 2005/096597 A1 | 10/2005 |

OTHER PUBLICATIONS

Supplementary European Search Report Issued to European Application No. 09802987.9. mailed Nov. 16, 2011.
Notce of Reasons for Rejection issued to Japanese Application No. 2008-249135, mailed Nov. 8, 2011.
International Search Report for PCT/JP2009/063487 dated Nov. 17, 2009.
Hyoungkeun Kim, Korean Intellectual Property Office, Office Action relating to corresponding Korean Application No. 10-2011-7001980, pp. 1-10, Aug. 1, 2012.
Official Action issued regarding Japanese Application No. 2001-269198, Feb. 19, 2013, 3 pages.
Official Action issued regarding Japanese Application No. 2012-051897, Feb. 12, 2013, 4 pages.
Official Action issued regarding Japanese Application No. 2011-269197, Feb. 12, 2013, 3 pages.
Notice of Reasons for Rejection issued to JP Application No. 2011-269198, mailed May 14, 2013.
Inquiry issued to JP Application No. 2011-269198, mailed Dec. 24, 2013, 4 pages.

* cited by examiner

PORTABLE ELECTRONIC DEVICE INCLUDING A PEDOMETER FUNCTION WITH SUPPRESSION OF COUNTING ERRORS

CROSS-REFERENCE TO RELATED APPLICATIONS

This application is the National Stage of International Application No. PCT/JP2009/063487, filed Jul. 29, 2009, which claims the benefit of Japanese Application No. 2008-195405, filed Jul. 29, 2008, Japanese Application No. 2008-218497, filed Aug. 27, 2008, and Japanese Application No. 2008-249135, filed Sep. 26, 2008, the entire contents of all of which are incorporated by reference herein.

FIELD OF THE INVENTION

The present invention relates to a portable electronic device such as a portable phone.

BACKGROUND OF THE INVENTION

In recent years, a portable phone as a portable electronic device is equipped with sensors such as an acceleration sensor, or a GPS (Global Positioning System) function for detecting the location of the portable phone, in order to detect conditions of the portable phone. In accordance with the conditions detected by the sensor, the portable phone runs a predetermined application software or changes control details. In addition, the portable phone controls communication functions and mail functions using positional information acquired by the GPS function.

Here, as the portable phone having a function utilizing a sensor, a portable phone is proposed that has an application program that performs a function of a pedometer, which counts the number of steps taken by the user utilizing acceleration data detected by an acceleration sensor (for example, refer to Patent Document 1).

Patent Document 1: Japanese Unexamined Patent Application Publication No. 2005-167758

SUMMARY OF THE INVENTION

Problems to be Solved by the Invention

However, in the portable phone of Patent Document 1, when vibration is applied to a portable phone by a vibration function that informs of arrival of a communication, since the acceleration sensor detects such vibration also, a large error may arise in the number of steps measured by the pedometer functionality.

In addition, in the portable phone of Patent Document 1, the acceleration sensor detects acceleration even when a portable phone is put on hard objects such as a desk, when an operation to open and close a folding type portable phone is performed, when a specific function is performed by bringing the portable phone to have artificial acceleration, and the like.

Accordingly, in the portable phone of Patent Document 1, accelerations produced by actions other than a walking action may be detected by the acceleration sensor, and the number of steps may be counted by the pedometer function based on the accelerations detected. For this reason, an error may arise between the number of steps counted by the pedometer function and the number of steps actually taken.

An object of the present invention is to provide a portable electronic device having a capability to count the number of steps, wherein errors in the count values are suppressed.

Means for Solving the Problems

The present invention relates to a portable electronic device comprising: a housing; an acceleration detection unit housed in the housing; and a step counting unit including a counting unit that counts a number of steps based on temporal changes in acceleration detected by the acceleration detection unit, and a correction unit that corrects the number of steps counted by the counting unit.

Moreover, preferably, the counting unit comprises: a timer unit housed in the housing; a determination unit that determines whether a waveform pattern detected by the acceleration detection unit is a 1A waveform pattern or a 2A waveform pattern; and a counting unit that counts a number of the 1A waveform patterns; and the correction unit comprises: a calculation unit that calculates a number of detections in a 1A detected value waveform pattern in a time period; a measurement unit that measures a duration period of a 2A detected value waveform pattern; a presumption unit that presumes a number of detections of the 1A detected value waveform patterns by multiplying the number of detections in a time period calculated by the calculation unit by the duration period measured by the measurement unit; and an adder unit that adds the number of detections presumed by the presumption unit to the count number in the counting unit.

Moreover, preferably, the step counting unit comprises an adder unit that determines whether the waveform pattern detected by the acceleration detection unit is a 1A waveform pattern which is a waveform pattern of a human being walking or running, or a 2A waveform pattern which is caused by an addition of other vibration to the walking motion or running motion of the human being, counts a number of the 1A waveform patterns, creates a virtual waveform pattern from the 2A waveform pattern, and adds a number of virtual waveform patterns having substantially identical shape to all or a part of the 1A waveform pattern in the virtual waveform pattern.

Moreover, preferably the counting unit comprises: a timer unit housed in the housing; a storage unit that stores information about a waveform pattern of temporal changes in acceleration values, which is information of a 1A threshold information about an oscillation period of a waveform pattern and a 2A threshold information about an amplitude of a waveform pattern; a 1A determination unit that determines whether a detected value waveform pattern that is a waveform pattern of temporal changes in acceleration values detected by the acceleration detection unit is a 1A detected value waveform pattern in which the oscillation period is greater than or equal to the 1A threshold and the amplitude is greater than or equal to the 2A threshold; a 2A determination unit that determines whether the detected value waveform pattern is a 2A detected value waveform pattern in which the oscillation period is smaller than the 1A threshold and the amplitude is greater than or equal to the 2A threshold, and the virtual waveform pattern calculated from the detected value waveform pattern has substantially identical shape to all or a part of the 1A detected value waveform pattern; and a 1A counting unit that counts a number of the 1A detected value waveform pattern determined by the 1A determination unit; and the correction unit comprises: a 2A counting unit that counts a number of the virtual waveform patterns in the 2A detected value waveform pattern determined by the 2A determination unit; and an adder unit that adds a count number in the 2A counting unit to a count number in the 1A counting unit.

Moreover, preferably, the counting unit comprises: a timer unit housed in the housing; a positional information acquisition unit that is housed in the housing and acquires positional information of the housing; a storage unit that stores information about a waveform pattern of temporal changes in acceleration values, which is information of a 1B threshold information about the oscillating period of the waveform pattern and 2B threshold information about the amplitude of the waveform pattern; a 1B determination unit that determines whether the amplitude is greater than or equal to the 2B threshold in the detected value waveform pattern that is a waveform pattern of temporal changes in acceleration values detected by the acceleration detection unit; a 2B determination unit that determines whether a current state is a moving state when the housing is moving based on the positional information in a case where the amplitude is determined as greater than or equal to the 2B threshold by the 1B determination unit; a 3B determination unit that determines whether the oscillating period of a detected value waveform pattern is greater than or equal to the 1B threshold in a case where the 2B determination unit determined that the current state is the moving state; and a 1B counting unit that counts a number of the 1B detected value waveform patterns determined as having the oscillation period greater than or equal to the 1B threshold by the 3B determination unit among the detected value waveform patterns; and the correction unit comprises: a calculation unit that calculates a number of detections in the 1B detected value waveform pattern in a time period; a measurement unit that measures a duration period of the 2B detected value waveform pattern determined as having the oscillation period smaller than the 1B threshold by the 3B determination unit among the detected value waveform patterns; a presumption unit that presumes a number of detections of the 1B detected value waveform patterns by multiplying the duration period measured by the measurement unit by the number of detections in a time period calculated by the calculation unit; and an adder unit that adds the number of detections presumed by the presumption unit to the count number in the count unit.

Moreover, preferably, the counting unit comprises: a timer unit housed in the housing; a positional information acquisition unit that is housed in the housing and acquires positional information of the housing; a storage unit that stores information about a waveform pattern of temporal changes in acceleration values, which is information of a 1B threshold information about the oscillation period of a waveform pattern and 2B threshold information about the amplitude of a waveform pattern; a 1B determination unit that determines that the amplitude is greater than or equal to the 2B threshold in the detected value waveform pattern that is a waveform pattern of temporal changes in acceleration values detected by the acceleration detection unit; a 2B determination unit that determines whether a current state is a moving state where the housing is moving based on the positional information in a case where the 1B determination unit determined that the amplitude is greater than or equal to the 2B threshold; a 3B determination unit that determines whether the oscillation period of the detected value waveform pattern is greater than or equal to the 1B threshold in a case where the 2B determination unit determined that the current state is the moving state; and a 1B counting unit that counts a number of the 1B detected value waveform patterns determined as having the oscillation period greater than or equal to the 1B threshold by the 3B determination unit among the detected value waveform patterns; and the correction unit comprises: a 2B counting unit that counts a number of virtual waveform patterns that are made by coupling adjacent top points in the 2B detected value waveform pattern determined as having the oscillation period smaller than the 1B threshold among the detected value waveform patterns; and an adder unit that adds the count number in the 1B counting unit to the count number in the 2B counting unit.

In addition, the present invention relates to a portable electronic device comprising: a housing; an acceleration detection unit housed in the housing; a counting unit that counts steps based on temporal changes of acceleration detected by the acceleration detection unit; a count determination unit that determines whether the counting unit determined that a fixed number of steps is counted from a start or restart of the count; a determination unit that determines whether a new step is counted by the counting unit during a predetermined period after the fixed number of steps has been counted if the count determination unit determined that the fixed number of steps has been counted; and a count control unit that controls the counting unit to cancel the fixed number of steps from total number of steps counted by the counting unit if the determination unit determined that a new step has not been counted within the predetermined period.

Effects of the Invention

An object of the present invention is to provide a portable electronic device having a capability to count the number of steps, wherein errors in the count number values are suppressed.

DETAILED DESCRIPTION OF THE INVENTION

Hereafter, Embodiment A to Embodiment C will be described as most preferred embodiments for implementing the present invention, with reference to the drawings.

First, Embodiment A will be described.

Figure 1:
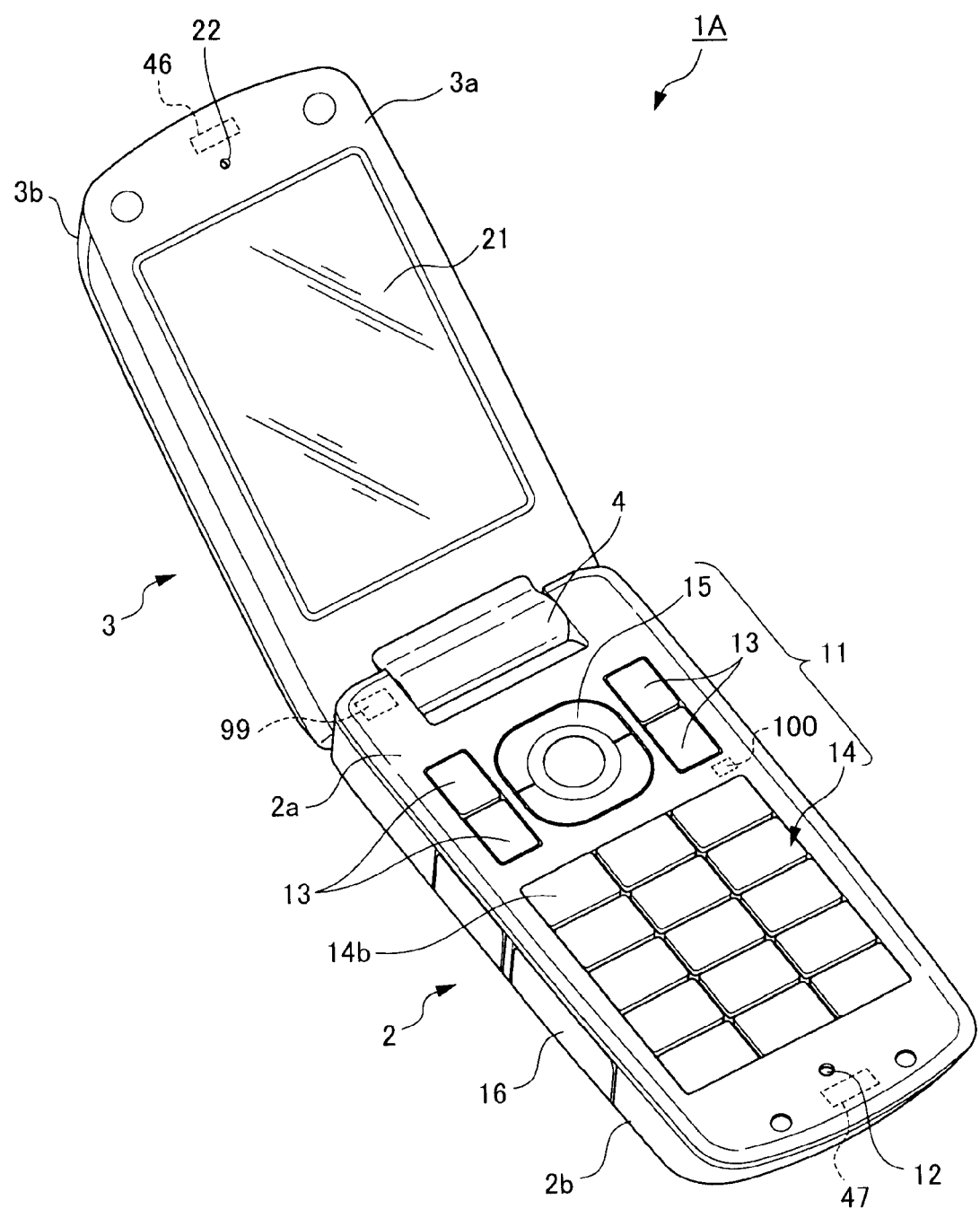
FIG. 1 is an appearance perspective view in a state where a portable phone 1A is opened.

A basic structure in the portable phone 1A as an electronic apparatus will be described with reference to FIG. 1. FIG. 1 shows an appearance perspective view in a state where the portable phone 1A is opened.

As shown in FIG. 1, the portable phone 1A includes a manipulation unit side housing 2 as a housing, and a display unit side housing 3. The manipulation unit side housing 2 and the display unit side housing 3 are connected such that the opening and closing thereof are possible via a connection portion 4 having a hinge mechanism. Specifically, an upper end portion of the manipulation unit side housing 2 and a lower end portion of the display unit side housing 3 are connected via the connection portion 4. Thereby, the portable phone 1A is configured such that it is possible to move the manipulation unit side housing 2 and the display unit side housing 3, which are connected via the hinge mechanism, relatively with each other. That is, the portable phone 1A can be in a state (opened state) where the manipulation unit side housing 2 and the display unit side housing 3 are opened, and a state (closed state) where the manipulation unit side housing 2 and the display unit side housing 3 are in a folded state. Here, a closed state means a state where both housings are arranged to overlap with each other, and an opened state means a state where both housings are arranged to not overlap with each other.

An outer surface of the manipulation unit side housing 2 is configured with a front case 2a and a rear case 2b. The manipulation unit side housing 2 is configured so that, at its front case 2a side, a group of operation keys 11 as an input means, and a voice input unit 12 as a microphone to which voice produced by the user of the portable phone 1A are respectively exposed.

The group of operation keys 11 is configured with a function setting operation key 13 for bringing various functions such as various settings, a telephone directory function, a mail function, and the like, and an input operation key 14 for inputting numbers of a telephone number, characters of mail and the like, for example, and a determination operation key 15, which is an operation member that performs determination in various operations, scrolling in up, down, left and right directions, and the like. A predetermined function is assigned to each key constituting the group of operation keys 11 according to the opening or closing state of the manipulation unit side housing 2 and the display unit side housing 3, various modes, type of application running, or the like (key assigning). Then, when the user presses the keys, an operation is executed according to the function assigned to each key.

The voice input unit 12 is arranged at an outer end portion side opposite to the connection portion 4 side in the longitudinal direction of the manipulation unit side housing 2. That is, the voice input unit 12 is arranged at the outer end portion side of one side when the portable phone 1A is in the opened state.

On a side face of one side of the manipulation unit side housing 2, an interface (not illustrated) for communicating with external devices (for example, a host device) is arranged. On a side face of the other side of the manipulation unit side housing 2, a side key to which a predetermined function is assigned, and an interface (not illustrated) with which insertion and removal of an external memory are performed are arranged. The interface is covered with a cap. Each interface is covered with a cap when not in use.

Figure 3:
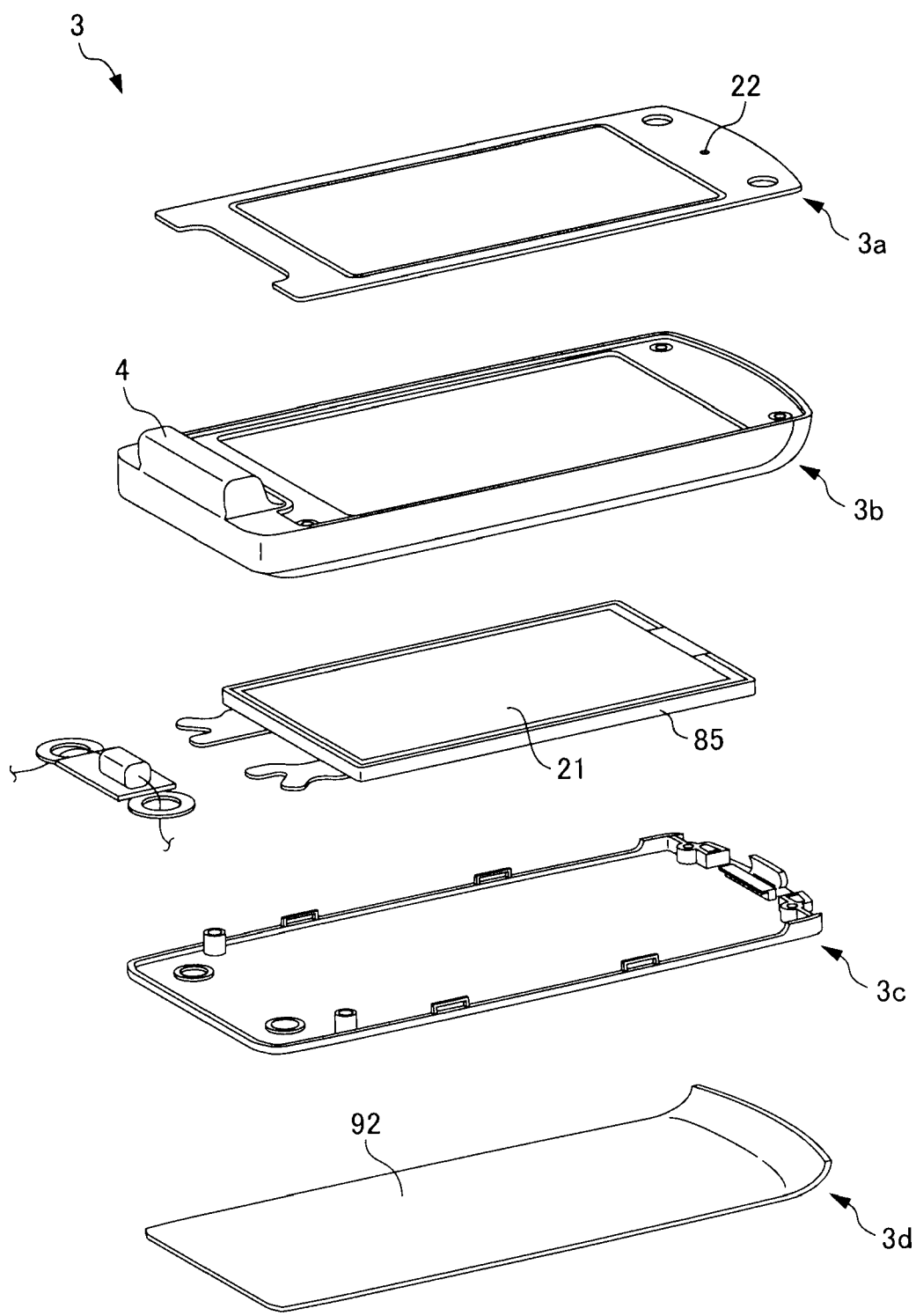
FIG. 3 is an exploded perspective view of a member housed in a display unit side housing 3.

An outer surface of the display unit side housing 3 is configured by a front panel 3a, a front case 3b, a rear case 3c (refer to FIG. 3), and a rear panel 3d (refer to FIG. 3). A display unit 21 for displaying a variety of information, and a voice output unit 22, which is a receiver that outputs voice of the other party of a call are arranged at the front case 3b in the display unit side housing 3 so that they are exposed. Here, the display unit 21 is configured by a liquid crystal panel, a drive circuit which drives this liquid crystal panel, and a light source unit such as a back light, which radiates light from a back side of this liquid crystal panel.

Figure 2:
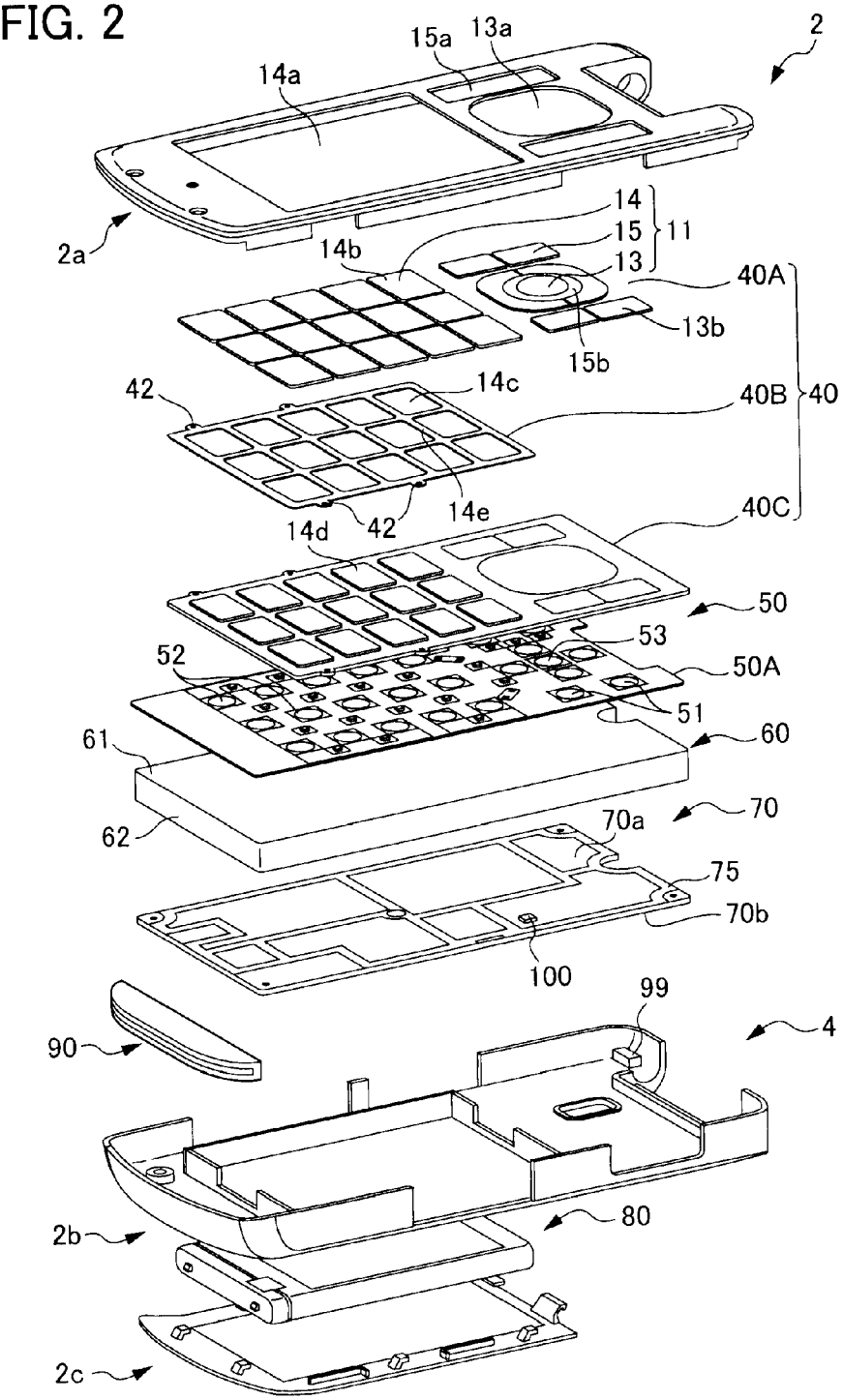
FIG. 2 is an exploded perspective view of a member housed in a manipulation unit side housing 2.

Next, with reference to FIG. 2 and FIG. 3, an internal structure of the manipulation unit side housing 2 and the display unit side housing 3 will be described. FIG. 2 is an exploded perspective view of a member housed in the manipulation unit side housing 2. FIG. 3 is an exploded perspective view of a member housed in the display unit side housing 3.

As shown in FIG. 2, the manipulation unit side housing 2 includes a front case 2a, a key structure portion 40, a key substrate 50, a case body 60, a circuit board 70 including various electronic parts such as a reference potential pattern layer 75 and an RF (Radio Frequency) module for a portable phone, an antenna unit 90, a rear case 2b including a battery lid 2c, and a battery 80.

The front case 2a and the rear case 2b are arranged so that their concave-shaped internal surfaces face each other and their outer circumferential edges overlap each other. In addition, a key structure portion 40, a key substrate 50, a case body 60, a circuit board 70, and an antenna unit 90 are housed between the front case 2a and the rear case 2b so as to be sandwiched therebetween.

Key holes 13a, 14a, and 15a are formed in the front case 2a on an internal surface that faces the display unit 21 of the display unit side housing 3 in a state where the portable phone 1A is folded together. From each of the key holes 13a, 14a and 15a, a pressing surface of the function setting operation key member 13b constituting the function setting operation key 13, a pressing surface of the input operation key member 14b constituting the input operation key 14, and a pressing surface of the determination operation key member 15b constituting the determination operation key 15 are exposed. By pressing the pressing surfaces of thus exposed function setting operation key member 13b, input operation key member 14b, and determination operation key member 15b, the top of a metal dome (bowl-shaped), which is described later, provided at each of the corresponding key switches 51, 52, and 53 is pressed and contacts a switch terminal to be electrically conducted to it.

The key structure portion 40 is configured with an operation member 40A, a key frame 40B as a reinforcement member, and a key seat 40C as a sheet member.

The operation member 40A is configured with a plurality of key operation members. Specifically, it is configured with a function setting operation key member 13b, an input operation key members 14b, and a determination operation key member 15b. Each of the operation key members constituting the operation member 40A is adhered to the key seat 40C by sandwiching the key frame 40B described later. The pressing surface on each of the operation key members adhered to the key seat 40C is arranged to be exposed outside from each of the key holes 13a, 14a and 15a, as described above.

The key frame 40B is a metallic plate-shaped member in which a plurality of hole portions 14c are formed. The key frame 40B is a reinforcement member for preventing adverse effects to the circuit board 70 or the like due to pressing of the input operation key member 14b. In addition, the key frame 40B is an electrically conductive member, and functions also as a member for releasing static electricity in the input operation key member 14b. Convex portions 14d formed on the key seat 40C described later are arranged to fit to a plurality of hole portions 14c formed in the key frame 40B. Then, the input operation key members 14b adheres to the convex portions 14d.

The key seat 40C is a sheet-shaped member made of silicone rubber having flexibility. A plurality of convex portions 14d are formed in the key seat 40C as described above. The plurality of convex portions 14d are formed on a surface of the key seat 40C on a side where the key frame 40B is to be arranged. Each of the plurality of convex portions 14d is formed at a position corresponding to the key switch 52 described later.

The key substrate 50 has a plurality of key switches 51, 52 and 53 arranged on the key seat 40C side. Each of the plurality of key switches 51, 52 and 53 are arranged at a position corresponding to each operation member 40A. The key switches 51, 52 and 53 arranged at the key substrate 50 have structures that have metal domes of metallic plates sterically formed so as to have a curved bowl shape. The metal dome is configured so that when the top of its bowl shape is pressed, it contacts the switch terminal formed on an electrical circuit (not illustrated) printed on the surface of the key substrate 50 and conducts electrically. It should be noted that, in the key substrate 50, wiring is sandwiched among a plurality of insulation layers (insulation films).

Since the key substrate 50 is arranged on a flat plate portion 61 in the case body 60, the pressure or flexure caused by each of the operation members 40A being pressed is difficult to be transmitted to the circuit board 70 arranged under the case body 60.

The case body 60 is an electrically conductive member having a shape in which one large surface in a thin rectangular parallelepiped has openings. The case body 60 has a rib 62 formed substantially perpendicular to the surface in the flat plate portion 61 on the opening side. The rib 62 is formed so that its height is equal to or sufficiently higher than the height of an electronic part having the highest height among various kinds of electronic parts implemented in the circuit board 70. The rib 62 is formed so that it is compatible with the reference potential pattern layer 75 constituting reference potential portions at the periphery and inside of the flat plate portion 61. Specifically, the rib 62 is formed so that it is arranged on the reference potential pattern layer 75 in a state where the case body 60 is arranged on the circuit board 70. It should be noted that the case body 60 may be formed of a metal, but alternatively, it may be configured by forming its framework with a resin and forming a conducting film on its surface.

The case body 60 is electrically connected to the reference potential pattern layer 75 by way of the bottom of the rib contacting with the reference potential pattern layer 75. The case body 60 is electrically conducted to the reference potential pattern layer 75 so that it has the same electric potential as the reference potential pattern layer 75. That is, the case body 60 functions as a shielding case. As the shielding case, the case body 60 suppresses noise from the outside such as high frequency noise impinging on various kinds of electronic parts arranged on the circuit board 70, and blocks noise emitted from an RF (Radio Frequency) circuit, a CPU circuit, a power supply circuit, or the like, and suppresses the noise impinging on other electronic parts, a receiving circuit connected to an antenna, and the like as well. Specifically, by way of the bottom of the rib 62 in the case body 60 being arranged on the reference potential pattern layer 75, each of the circuits described later is enclosed by the rib 62 and is covered with a part of the flat plate portion 61 as well. The rib 62 functions as a dividing wall in each circuit, and shields each circuit together with a part of the flat plate portion 61.

At the circuit board 70, various kinds of electronic parts or circuits including a signal processing unit which processes the signal that the antenna unit 90 transmits and receives and including a CPU 45A and a memory 44A, which are not illustrated, are arranged. Various kinds of electronic parts form a plurality of circuit blocks with a predetermined combination. For example, various kinds of circuit blocks including an RF (Radio Frequency) circuit, a power supply circuit, and the like are formed.

On a first surface 70a in the circuit board 70 on the case body 60 side, the reference potential pattern layer 75 constituting a reference potential portion is formed besides various kinds of electronic parts. The reference potential pattern layer 75 is formed so that each circuit block described above is sectioned. The reference potential pattern layer 75 is formed by printing an electrically conductive member on the surface of the first surface 70a of the circuit board 70 with a predetermined pattern.

Here, a three axis acceleration sensor 100 as an acceleration detection unit constituting the pedometer function unit described later is mounted on the circuit board 70. The three axis acceleration sensor 100 detects acceleration in each of the three axis directions, X-axis, Y-axis and Z-axis, upon the manipulation unit side housing 2 (the portable phone 1A) is moved. The three axis acceleration sensor 100 detects acceleration (change) produced by walking motion e of the user who brings the portable phone 1A, or acceleration (change) produced in the manipulation unit side housing 2 (portable phone 1A) by a vibration producing unit 99 described later, for example. The three axis acceleration sensor 100 outputs information on the detected acceleration values to the CPU 45A. The details of processing of the acceleration values detected by the three axis acceleration sensor 100 will be described in detail later.

The antenna unit 90 is configured by an antenna element having a predetermined shape arranged on a base. The antenna unit 90 is arranged at an end portion side in the portable phone 1A opposite to the connection portion 4 side. The antenna element of this antenna unit 90 is formed of a belt-shaped sheet metal. In addition, electric power is supplied to the antenna unit 90 from the circuit board 70 through the feed terminal, which is not illustrated. Thereby, electric power is supplied to the antenna element from the circuit board 70 through a feed terminal and the antenna element is connected to an RF module of the circuit board 70, and the like, as well.

A dismountable battery lid 2c is formed on one end side (in FIG. 2) of the rear case 2b and is put on the rear case 2b after placing the battery 80 from the outside of the rear case 2b. In addition, the voice input unit 12, which is not illustrated, which inputs the user's voice is housed on a side of one end of the rear case 2b.

A vibration producing unit 99 is arranged on the connection portion 4 side of the rear case 2b. The vibration producing unit 99 is configured to have a motor, which is not illustrated, and an eccentric weight attached to the output portion of the motor. The vibration producing unit 99 is connected to the circuit board 70 via wiring, which is not illustrated. The vibration producing unit 99 produces a predetermined vibration to the manipulation unit side housing 2 (portable phone 1A) based on the instruction from CPU 45A mounted on the circuit board 70. For example, the vibration producing unit 99 makes the manipulation unit side housing 2 (portable phone 1A) produce vibration in order to inform the user about arrival of a communication at the time of the arrival of the communication. Here, the vibration producing unit 99 provides vibration to the manipulation unit side housing 2 (portable phone 1A) in the above-described walking state (the 2A pattern, the 2A waveform pattern), and provides vibration to the manipulation unit side housing 2 (portable phone 1A) in a static state (the 3A pattern, the 3A waveform pattern).

As shown in FIG. 3, the display unit side housing 3 includes the front panel 3a, the voice output unit 22, the front case 3b, the voice output unit 22, the display unit 21, the printed circuit board 85 to which the display unit 21 is connected, the rear case 3c, and the rear panel 3d.

At the display unit side housing 3, the front panel 3a, the front case 3b, the display unit 21, the printed circuit board 85, the rear case 3c, and the rear panel 3d are respectively arranged in a stacked manner. Specifically, the front case 3b and the rear case 3c are arranged so that their concave internal surfaces face each other, and they are joined together so that their outer circumferential edges overlap with each other.

Then, the printed circuit board 85 to which the display unit 21 is connected is sandwiched between the front case 3b and the rear case 3c and is housed therein. A speaker is connected to the printed circuit board 85 to which an amplifier, which is not illustrated, is connected.

Next, the circuit configuration of the portable phone 1A will be described with reference to FIG. 4 to FIG. 7.

Figure 4:
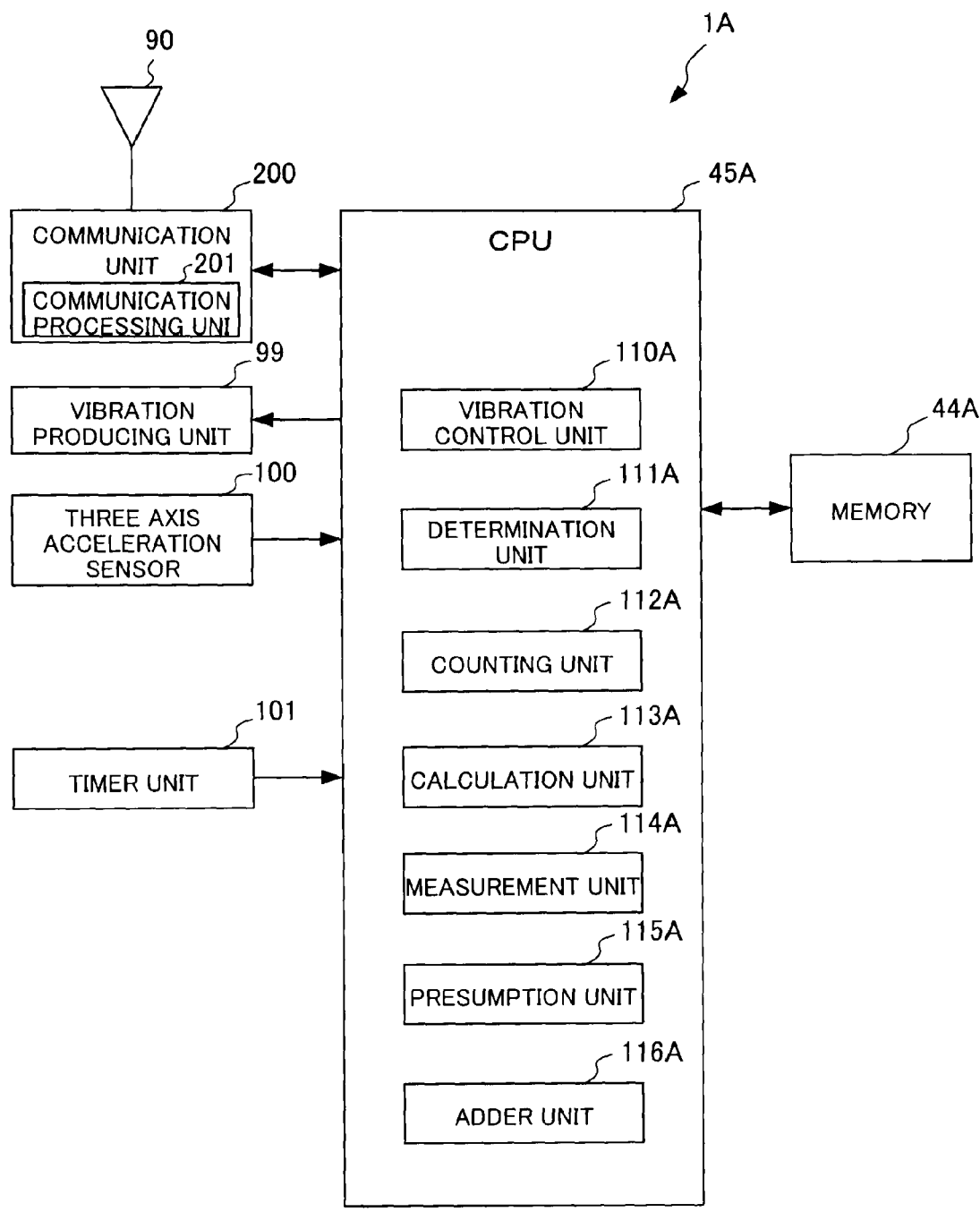
FIG. 4 is a block diagram illustrating a circuit configuration in the portable phone 1A of Embodiment A.
Figure 5:
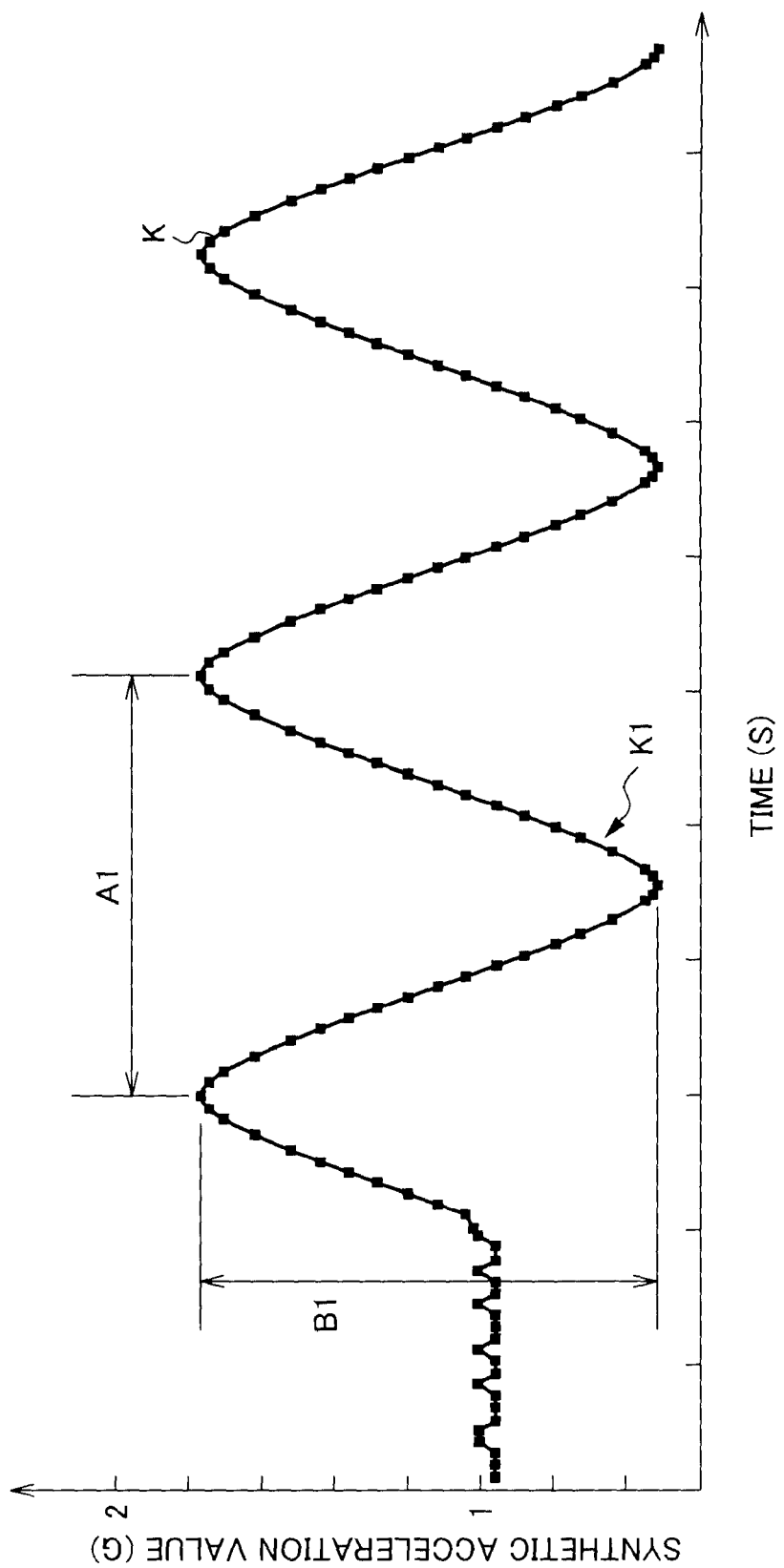
FIG. 5 is a chart showing temporal changes in synthetic acceleration values in a 1A state (walking state).
Figure 6:
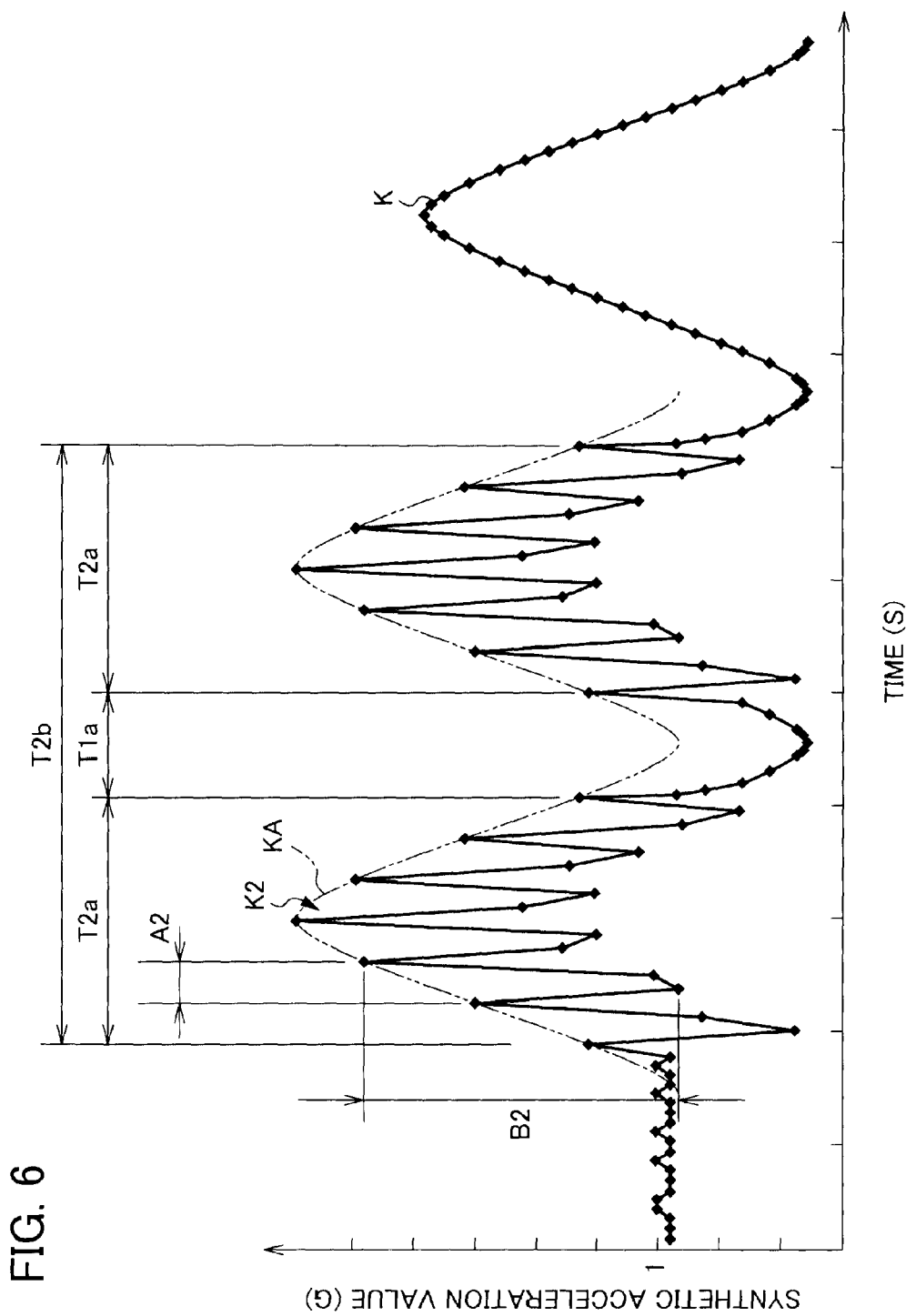
FIG. 6 is a chart showing temporal changes in synthetic acceleration values in a 2A state (walking state+vibration by a vibration producing unit 99).
Figure 7:
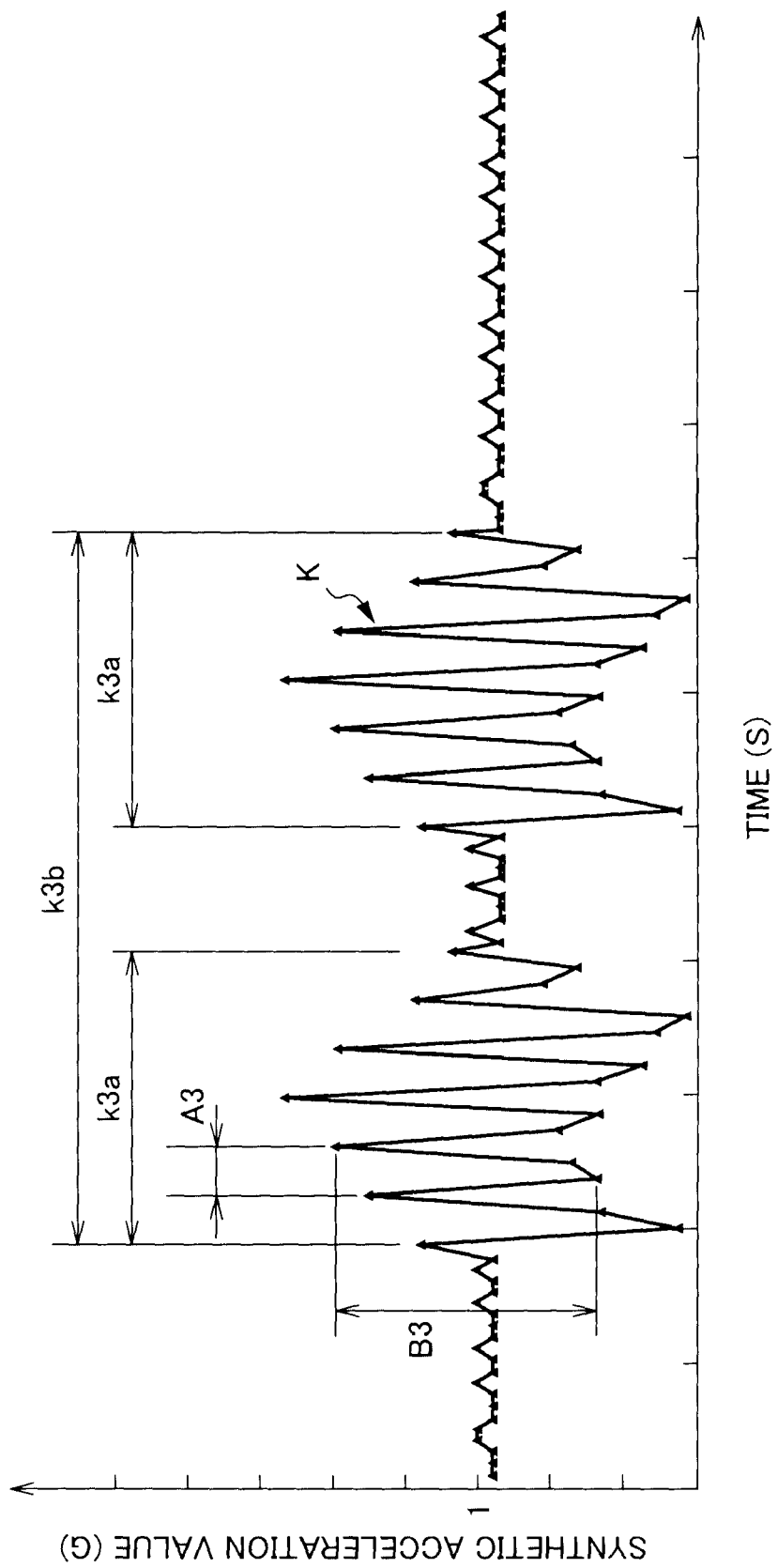
FIG. 7 is a chart showing temporal changes in synthetic acceleration values in a 3A state (only vibration by the vibration producing unit 99).

FIG. 4 is a block diagram illustrating a circuit configuration in the portable phone 1A. FIG. 5 is a chart showing temporal changes in synthetic acceleration values in a 1A state (walking state). FIG. 6 is a chart showing temporal changes in synthetic acceleration values in a 2A state (walking state+ vibration by the vibration producing unit 99). FIG. 7 is a chart showing temporal changes in synthetic acceleration values in a 3A state (only vibration by the vibration producing unit 99).

As shown in FIG. 4, a communication unit 200, the vibration producing unit 99, the three axis acceleration sensor 100, a timer unit 101, a vibration control unit 110A as a functional unit included in the CPU 45A, a determination unit 111A, a counting unit 112A, a calculation unit 113A, a measurement unit 114A, a presumption unit 115A, an adder unit 116A, and a memory 44A are included. Here, the portable phone 1A has a pedometer function unit for conducting a pedometer function. The pedometer function unit is configured to include the three axis acceleration sensor 100 and the timer unit 101, the determination unit 111A as a functional unit included in the CPU 45A, the counting unit 112A, the calculation unit 113A, the measurement unit 114A, the presumption unit 115A, the adder unit 116A and the memory 44A.

The communication unit 200 includes an antenna unit 90 which conducts communication with an external device with a predetermined utilization frequency band, and a communication processing unit 201 which performs signal processing such as modulation processing and demodulation processing.

The antenna unit 90 conducts communication with an external device (base station) with a predetermined utilization frequency band (for example, 800 MHz). It should be noted that in the present embodiment, although the predetermined utilization frequency band is 800 MHz, it may be other frequency bands. In addition, the antenna unit 90 may have a structure of a so-called dual band supported type, which can support a second utilization frequency band (for example, 2 GHz) in addition to the predetermined utilization frequency band (first utilization frequency band), and furthermore, may have a structure of a multi-band supporting type, which can support a third utilization frequency band also.

The communication processing unit 201 performs demodulation processing of the signal received through the antenna unit 90 and supplies it to a processing unit, which is not illustrated, and performs modulation processing of the signal supplied from the processing unit, and transmits it to an external device (base station) through the antenna unit 90 as well.

As described above, the vibration producing unit 99 is configured to include a motor, which is not illustrated, and the eccentric weight attached to the output portion of the motor. The vibration producing unit 99 is connected to the circuit board 70 by wiring, which is not illustrated. The vibration producing unit 99 causes the operation unit side housing 2 (portable phone 1A) to produce a predetermined vibration based on the instruction from the vibration control unit 110A, which serves as a functional unit included in the CPU 45A mounted on the circuit board 70. For example, the vibration producing unit 99 is caused to produce vibration at the manipulation unit side housing 2 (portable phone 1A) in order to inform the user about arrival of a communication at the time of the arrival of the communication. Here, the vibration producing unit 99 provides vibration to the manipulation unit side housing 2 (portable phone 1A) in the above-described walking state (the 2A pattern, the 2A waveform pattern), and provides vibration to the manipulation unit side housing 2 (portable phone 1A) in a static state (Pattern 3A, the 3A waveform pattern).

The three axis acceleration sensor 100 detects the acceleration of the manipulation unit side housing 2 (portable phone 1A) in the three axis directions (X, Y and Z).

The acceleration sensor 100 is of a three axis (three dimensions) type, which detects the acceleration in X axial direction, Y axial direction, and Z axial direction, which intersect orthogonally among them, and measures the acceleration (a) based on the force (F) applied from the outside and the mass (m) (Acceleration (a)=Force (F)/Mass (m)).

In addition, the acceleration sensor 100 measures the force applied to predetermined mass by a piezoelectric device and obtains the acceleration for each axis, and makes numerical data and buffers it. Then, the CPU (control unit) 45 reads the acceleration data buffered periodically. It should be noted that the acceleration sensor 100 is not limited to a piezoelectric device (piezo-electric type) and it may be configured of types such as a MEMS (Micro Electro Mechanical Systems) type of a piezoresistance type, an electrostatic capacity type, a heat detection type, and the like, a servo type, which moves a movable coil and returns it to its original position by way of a feedback current, a strain gauge type, which measures strain produced by the acceleration with a strain gauge.

The acceleration information from the three axis acceleration sensor 100 is outputted to the determination unit 111A.

The timer unit 101 has a time measuring function. The timer unit 101 is configured so that it can output time information including the current time. The time information outputted from the timer unit 101 is configured so that it can be outputted to the calculation unit 113A and the measurement unit 114A described later.

The memory 44A stores various application programs and varieties of information such as an application program which operates a pedometer function. In addition, the memory 44A stores in advance information about the waveform pattern of temporal changes in acceleration values. Specifically, it stores in advance at least information about a 1A waveform pattern when the manipulation unit side housing 2 (portable phone 1A) is moving due to the walking motion of a user, information about a 2A waveform pattern when a continuous or intermittent vibration is applied by the vibration producing unit 99, and information about a 3A waveform pattern when only the continuous or intermittent vibration by the vibration producing unit 99 is applied.

In the present embodiment, the memory 44A stores information about the waveform pattern of temporal changes in the synthetic acceleration values obtained by synthesizing the acceleration values in the three axis directions. The memory 44A stores amplitude information and oscillation period information in the waveform pattern. Here, the memory 44A stores the waveform pattern for every cycle. It should be noted that when the acceleration value is (X, Y, Z), the synthetic acceleration value (G) is represented by the following formula (Mathematical Expression 1).

[Math.1]

The vibration control unit 110A instructs the vibration producing unit 99 to generate vibration. For example, as described above, when the communication unit 200 receives arrival of a communication from an external device, the vibration control unit 110A conducts an instruction to the vibration producing unit 99 to drive the vibration producing unit 99 (vibration is produced) in order to inform the user about the arrival of the communication. Here, the vibration control unit 110A instructs the vibration producing unit 99 in accordance with an alarm function, a mail function, and the like, in addition to the time of the arrival of the communication.

The determination unit 111A determines a state of the portable phone 1A based on the acceleration information from the three axis acceleration sensor 100. The determination unit 111A determines the state of the portable phone 1A based on a detected value waveform pattern which is a waveform pattern of temporal changes in the synthetic acceleration values obtained by synthesizing the acceleration values in the three axis directions from the three axis acceleration sensor 100.

Specifically, the determination unit 111A compares the detected value waveform pattern which is a pattern of the temporal changes in the synthetic acceleration values of the acceleration values detected by the three axis acceleration sensor 100, and the waveform pattern stored in the memory 44A. Then, the determination unit 111A determines whether the detected value waveform pattern is the 1A waveform pattern in the 1A state, which is a move in a walking state, the 2A waveform pattern in the 2A state, which is a move in a state where the vibration by the vibration producing unit 99 is applied in a walking state, or the 3A waveform pattern in the 3A state, which is a move in a state where only the vibration by the vibration producing unit 99 is applied.

The determination unit 111A may compare the 1A waveform pattern, the 2A waveform pattern or the 3A waveform pattern to the measurement value waveform pattern with their respective waveforms, may compare with the amplitude and the oscillation period, or may compare with a combination thereof. In addition, the determination unit 111A may also compare the 1A waveform pattern, the 2A waveform pattern or the 3A waveform pattern to the measurement value waveform pattern through, for example, a predetermined threshold that is set based on the 1A waveform pattern, the 2A waveform pattern or the 3A waveform pattern.

For example, the determination unit 111A determines whether the detected value waveform pattern is a 1A detected value waveform pattern in which the oscillation period is greater than or equal to the 1A threshold (AX) and the amplitude is greater than or equal to the 2A threshold BX. The 1A threshold AX and the 2A threshold BX are values set based on the 1A waveform pattern. The 1A threshold AX and the 2A threshold BX can be stored in advance in the memory 44A, for example. Here, the 2A threshold BX can be, for example, 0.4 G (±0.2 G, a static state as the reference), but is not limited to this and may be set as appropriate.

Specifically, as shown in FIG. 5, the determination unit 111A determines whether the waveform pattern K of the synthetic acceleration values (G) is the 1A detected value waveform pattern K1 in which the oscillation period A1 is greater than or equal to the 1A threshold AX and the amplitude B1 is greater than or equal to the 2A threshold BX. The determination unit 111A determines whether the detected value waveform pattern is the 1A detected value waveform pattern which is the 1A waveform pattern that is a move in a walking state.

In addition, for example, the determination unit 111A determines whether the detected value waveform pattern is the 2A detected value waveform pattern in which the oscillation period is smaller than the 1A threshold AX and the amplitude is greater than or equal to the 2A threshold BX, and the virtual waveform pattern made by coupling the top of waveform patterns adjoining with each other has substantially the same shape as all or a part of the 1A detected value waveform pattern as well.

Specifically, as shown in FIG. 6, the determination unit 111A determines whether the waveform pattern K of the synthetic acceleration values (G) is the 2A detected value waveform pattern K2 in which the oscillation period A2 is smaller than the 1A threshold AX and the amplitude B2 is greater than or equal to the 2A threshold BX, and the virtual waveform pattern KA which is made by coupling the top of waveform patterns adjoining with each other has substantially the same shape as all or a part of the 1A detected value waveform pattern K1 as well.

In addition, the determination unit 111A determines whether the detected value waveform pattern is a 3A detected value waveform pattern in which the oscillation period is smaller than the 1A threshold AX and the amplitude is greater than or equal to the 2A threshold BX, and the virtual waveform pattern has a different shape than the 1A detected value waveform pattern as well.

Specifically, as shown in FIG. 7, the determination unit 111A determines whether the waveform pattern K of the synthetic acceleration values (G) is the 3A detected value waveform pattern in which the oscillation period A3 is smaller than the 1A threshold AX and the amplitude B3 is greater than or equal to the 2A threshold BX, and the virtual waveform pattern KA has a different shape than the 1A detected value waveform pattern K as well.

The counting unit 112A counts the number of the 1A detected value waveform patterns serving as the detected value waveform pattern determined as the 1A waveform pattern by the determination unit 111A. For example, when counting the number of the 1A detected value waveform patterns in a continuous waveform pattern, the counting unit 112A can count the number of the 1A detected value waveform patterns by counting local maximum points (local minimum points). Here, the number of the 1A detected value waveform patterns is counted as the number of user's steps.

The calculation unit 113A calculates the number of detections in the 1A detected value waveform patterns in a time period. The number of detections in the 1A detected value waveform patterns in a time period calculated by the calculation unit 113A is outputted to a presumption unit 115A described later.

The measurement unit 114A measures the duration period of the 2A detected value waveform pattern serving as the detected value waveform pattern determined as the 2A waveform pattern by the determination unit 111A. The measurement unit 114A measures the duration period of the 2A detected value waveform pattern utilizing time information from the timer unit 101. Here, in the present embodiment, although the duration period T2$a$ of the 2A detected value waveform pattern K2 in FIG. 6 is measured as the duration period, the duration period T2$b$ (T2$a$+T1$a$+T2$a$) in the period when the vibration is applied intermittently can be used as the duration period.

The presumption unit 115A calculates the number of presumed detections of the 1A detected value waveform patterns by multiplying the number of detections in a time period calculated by the calculation unit 113A in the duration period measured by the measurement unit 114A. The number of detections in a time period utilized in the presumption unit 115A may be an average number of detections in all the time period determined as the 1A detected value waveform pattern from the time when the user started to walk, and may be an average number of detections at the time immediately before the occurrence of the 2A detected value waveform pattern.

The adder unit 116A adds the number of detections of the 1A detected value waveform patterns calculated (presumed) by the presumption unit 115A to the count number in the counting unit 112A. Here, when the detected value waveform pattern is the 3A detected value waveform pattern in the 3A state where the move occurs only by way of the vibration from the vibration producing unit 99, the adder unit 116A does not change the count number (the addition is not conducted).

The number that is added a predetermined number of detections by the adder unit 116A is a number of the 1A detected value waveform patterns to which the number of detections in the 2A state is complemented. That is, the number that is added a predetermined number of detections is the number of user's steps presumed of the steps in the 2A state and complemented (corrected).

Next, the operation of the pedometer function unit in the present embodiment will be described with reference to FIG. 8.

Figure 8:
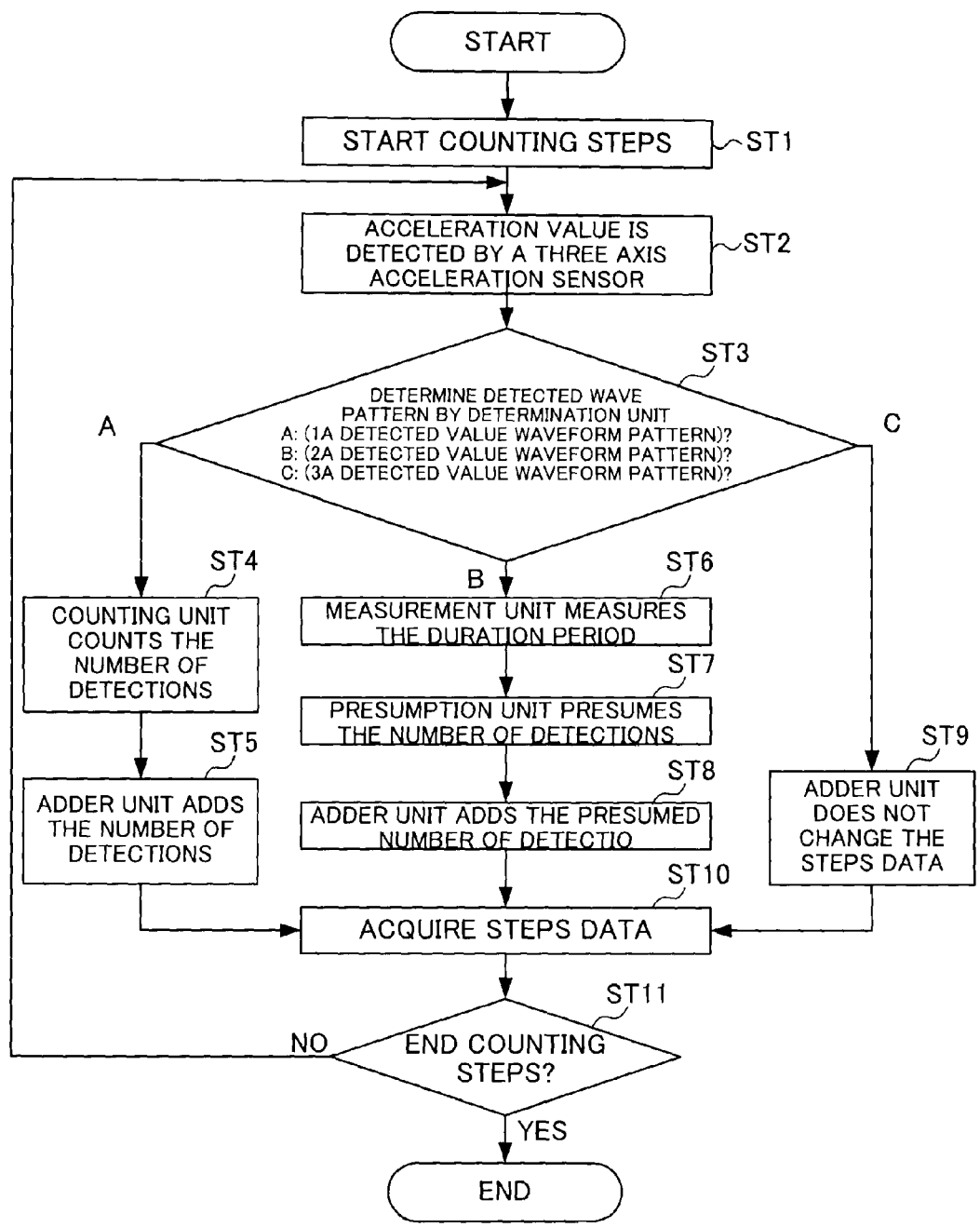
FIG. 8 is a flow chart illustrating an operation in a pedometer function unit.

FIG. 8 is a flow chart illustrating the operation in the pedometer function unit.

First, counting the number of steps is started by a predetermined operation (ST1). Thereby, the three axis acceleration sensor 100 measures the acceleration values at the manipulation unit side housing 2 (portable phone 1A) in each of the three axis directions (ST2).

Next, the determination unit 111A compares the 1 waveform pattern, the 2A waveform pattern and the 3A waveform pattern stored in advance in the memory 44A, and the detected value waveform pattern. Then, the determination unit 111A determines whether the detected value waveform pattern is the 1A detected value waveform pattern having the same waveform pattern as the 1A waveform pattern (A), the 2A detected value waveform pattern having the same waveform pattern as the 2A waveform pattern (B), and the 3A detected value waveform pattern having the same waveform pattern as the 3A waveform pattern (C) (ST3). Here, in order for the determination unit 111A to determine as the same waveform, the detected value waveform pattern need not be completely identical to the 1A waveform pattern, the 2A waveform pattern, or the 3A waveform pattern, and it is only needed to able to consider it as the same type from the shape, the amplitude, or the oscillation period and shape. For example, by comparing the virtual oscillation period and the virtual amplitude, and the shape of peaks and troughs of the waveform of the above-described virtual waveform pattern, the determination unit 111A determines whether it is possible to consider them as the same type.

Next, if it is determined as the 1A detected value waveform pattern by the determination unit 111A (A), the counting unit 112A counts the number of detections of the 1A detected value waveform patterns (ST4).

Then, the adder unit 116A adds the number of detections counted by the counting unit 112A to the count number that has been counted by then (ST5).

Next, if it is determined as the 2A detected value waveform pattern by the determination unit 111A (B), the measurement unit 114A measures the duration period of the 2A detected value waveform pattern (ST6).

In addition, the presumption unit 115A calculates (presumes) the number of detections of the 1A detected value waveform patterns during the duration period by multiplying the number of detections in a time period in the 1A detected value waveform pattern calculated by the calculation unit 113A by the duration period measured by the measurement unit 114A (ST7).

Then, the adder unit 116A adds the number of presumed detections presumed by the presumption unit 115A to the count number that has been counted by then (ST8).

Next, if it is determined as the 3A detected value waveform pattern by the determination unit 111A (C), the adder unit 116A does not change the data of the number of steps which is the count number that has been counted by then (ST9).

As described above, the number of detections or the number of presumed detections is added to the count number that has been counted by then by the adder unit 116A, and the data of the number of steps is acquired (accumulated) (ST10).

Then, when counting the number of steps ends by a predetermined operation, the counting of the number of steps ends (ST11, YES), and when counting the number of steps is not ended, counting the number of steps is continued (ST11, NO).

In accordance with the present embodiment, it is possible to provide the portable phone 1A having a pedometer function in which the occurrence of a large error in the measured value due to the vibration produced by the vibration producing unit 99 is suppressed.

In addition, in accordance with the present embodiment, since the measured value of the number of steps is complemented with the number of presumed steps that is based on the average number of detections of the step(s) in the 1A state which is a walking state, in the 2A state where the vibration is applied by the vibration producing unit 99 in the walking state of the user, it is possible to provide the portable phone 1A having a high accuracy pedometer function.

Figure 9:
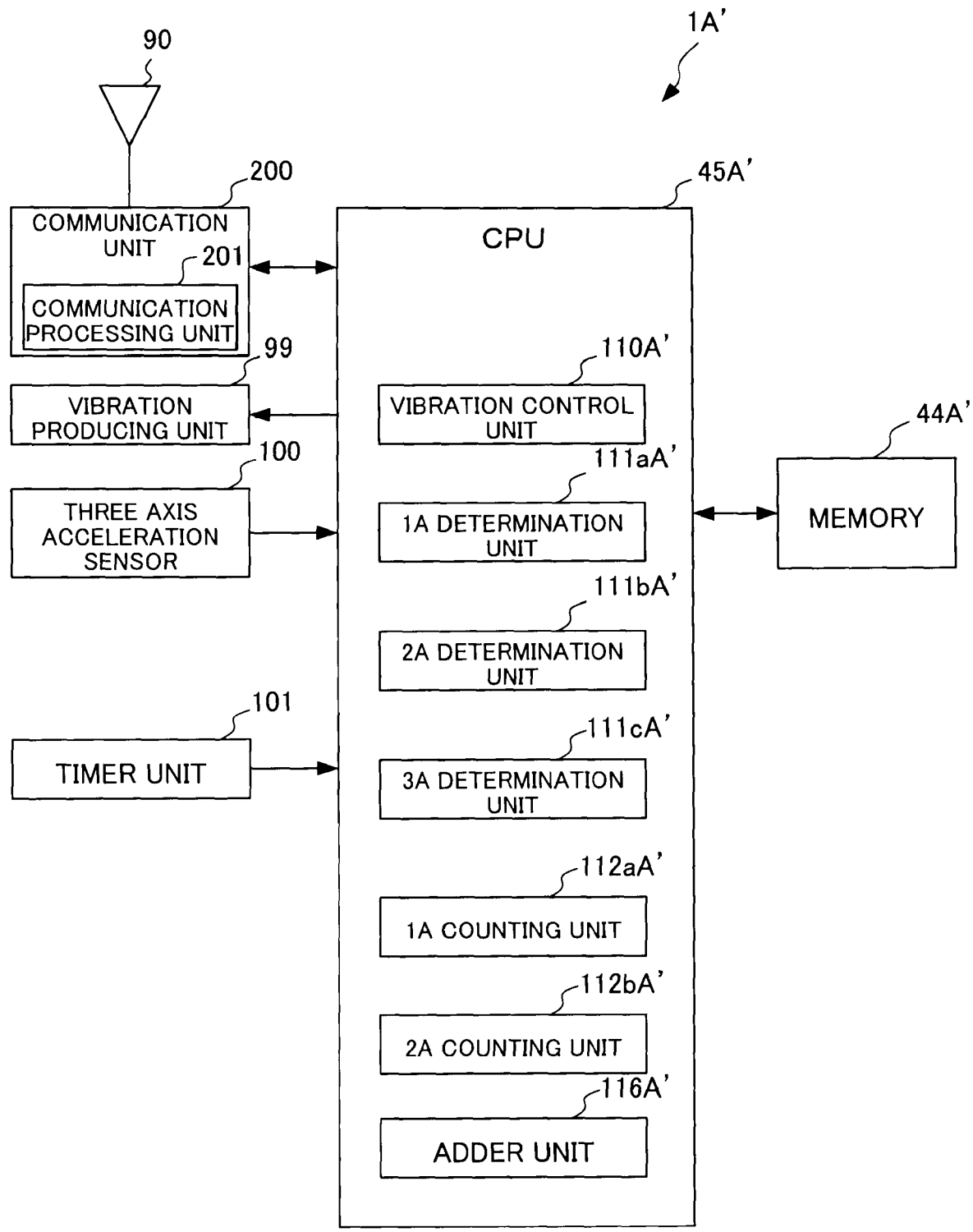
FIG. 9 is a block diagram illustrating a circuit configuration in another embodiment corresponding to Embodiment A.

Here, in Embodiment A, although the portable phone 1A complements (corrects) the measurement value of the number of steps by presuming the number of detections of the 1A detected value waveform patterns during the duration period of the 2A detected value waveform pattern by the presumption unit 115A, it is not limited to this, and for example, the measurement value of the number of steps may be complemented (corrected) by detecting the number of detections of the above-described virtual waveform patterns and by the number of the detections as well. Hereafter, the embodiment in this case will be described with reference to FIG. 9. Here, since the overall structure is similar to that of the embodiment described above, the description will be focused on different points mainly. FIG. 9 is a block diagram illustrating a circuit configuration in another embodiment corresponding to Embodiment A.

As shown in FIG. 9, the portable phone 1A' in the another embodiment corresponding to Embodiment A includes a communication unit 200, a vibration producing unit 99, a three axis acceleration sensor 100, a timer unit 101, a vibration control unit 110A' as a functional unit included in the CPU 45A', a 1A determination unit 111aA', a 2A determination unit 111bA', a 3A determination unit 111cA', a 1A counting unit 112aA', a 2A counting unit 112bA', a 1A adder unit 116A', and a memory 44A'.

The 1A determination unit 111aA' determines whether the detected value waveform pattern which is a waveform pattern of temporal changes in the acceleration values detected by the three axis acceleration sensor 100 is the 1A detected value waveform pattern in which the oscillation period is greater than or equal to the 1A threshold AX and the amplitude is greater than or equal to the 2A threshold BX. Here, as is with the above description, for example, by comparing the virtual oscillation period and the virtual amplitude, and the shape of peaks and troughs of the waveform of the above-described virtual waveform pattern, the 1A determination unit 111aA' determines whether it is possible to consider them as the same type.

The 2A determination unit 111bA' determines whether the detected value waveform pattern is the 2A detected value waveform pattern in which the oscillation period is smaller than the 1A threshold AX and the amplitude is greater than or equal to the 2A threshold BX, and the virtual waveform pattern which is made by coupling the top of the waveform patterns adjoining with each other has a substantially identical shape as all or a part of the 1A detected value waveform pattern. As described above, for example, by comparing the virtual oscillation period and the virtual amplitude, and the shapes of the peaks and troughs of the waveform of the above-described virtual waveform pattern, the 2A determination unit 111bA' determines whether it is possible to consider them as the same type. It should be noted that the average sum value of the maximum (top) of the waveform pattern and the minimum that adjoins (is continuos with) this may be calculated so as to use the virtual waveform pattern that has been made by coupling these average sum values instead of the above-described virtual waveform pattern.

The 3A determination unit 111cA' determines whether the detected value waveform pattern is the 3A detected value waveform pattern in which the oscillation period is smaller than the 1A threshold AX and the amplitude is greater than or equal to the 2A threshold BX, and the virtual waveform pattern of either one of the above has a different shape than the 1A detected value waveform pattern.

The 1A counting unit 112aA' counts the number of the 1A detected value waveform patterns that has been determined by 1A determination unit 111aA'.

The 2A counting unit 112bA' counts the number of the virtual waveform patterns in the 2A detected value waveform pattern that has been determined by the 2A determination unit 111bA'.

Then, the adder unit 116A' adds the count number of the virtual waveform patterns in 2A counting unit 112b to the count number of the 1A detected value waveform patterns in 1A counting unit 112aA'. In addition, the adder unit 116A' does not change the count number if it is determined that the detected value waveform pattern is the 3A detected value waveform pattern by the 3A determination unit 111c.

In accordance with the another embodiment described above, it is possible to perform high accuracy measurement of the number of steps by complementing (correcting) the measurement values of the number of steps. In addition, in accordance with the above-described another embodiment, it is possible to obtain similar advantageous effects to Embodiment A described above.

Next, Embodiment B will be described.

The circuit configuration of the portable phone 1B will be described with reference to FIG. 10 to FIG. 13.

Figure 10:
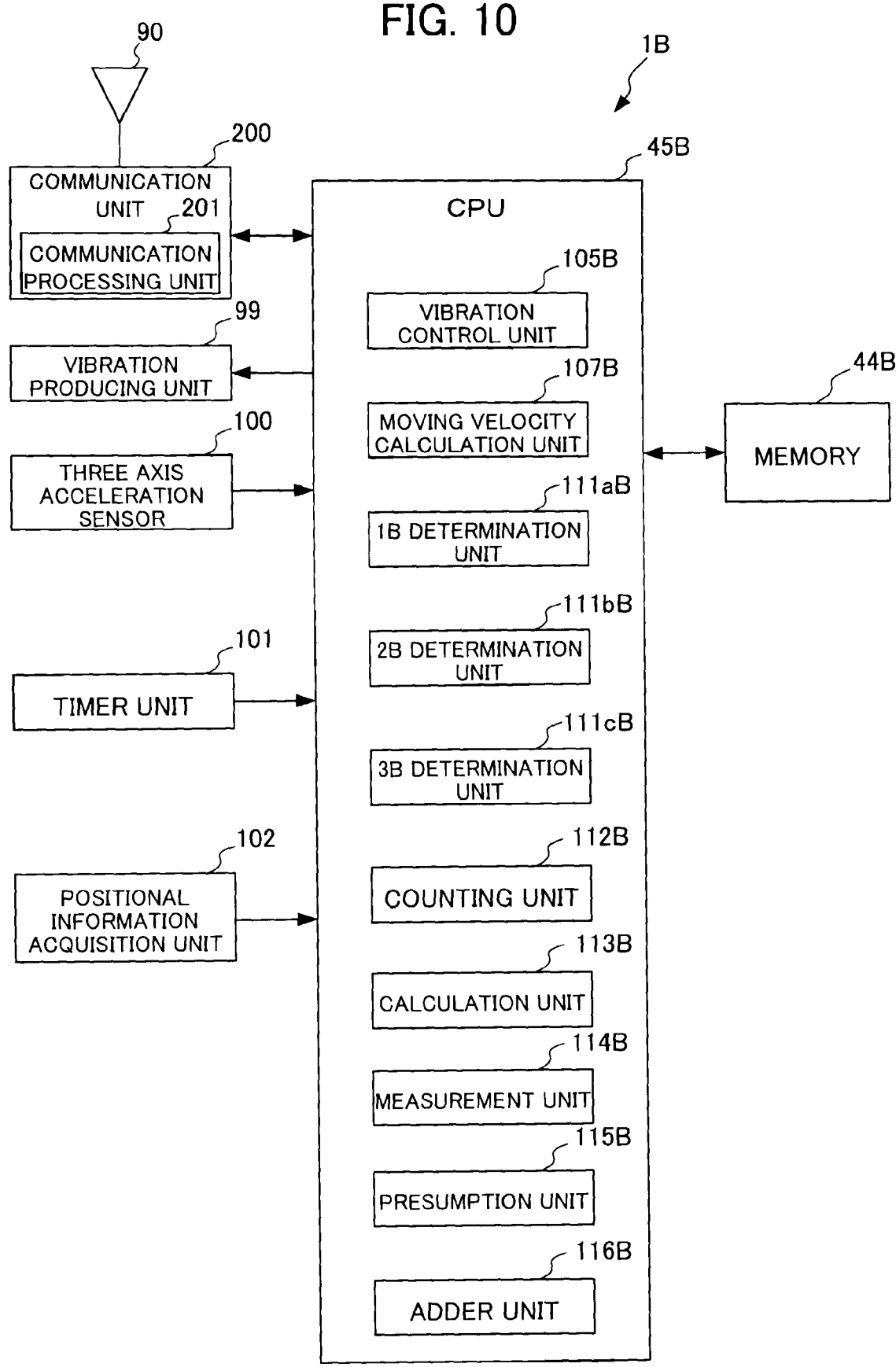
FIG. 10 is a block diagram illustrating a circuit configuration in a portable phone 1 of Embodiment B.
Figure 11:
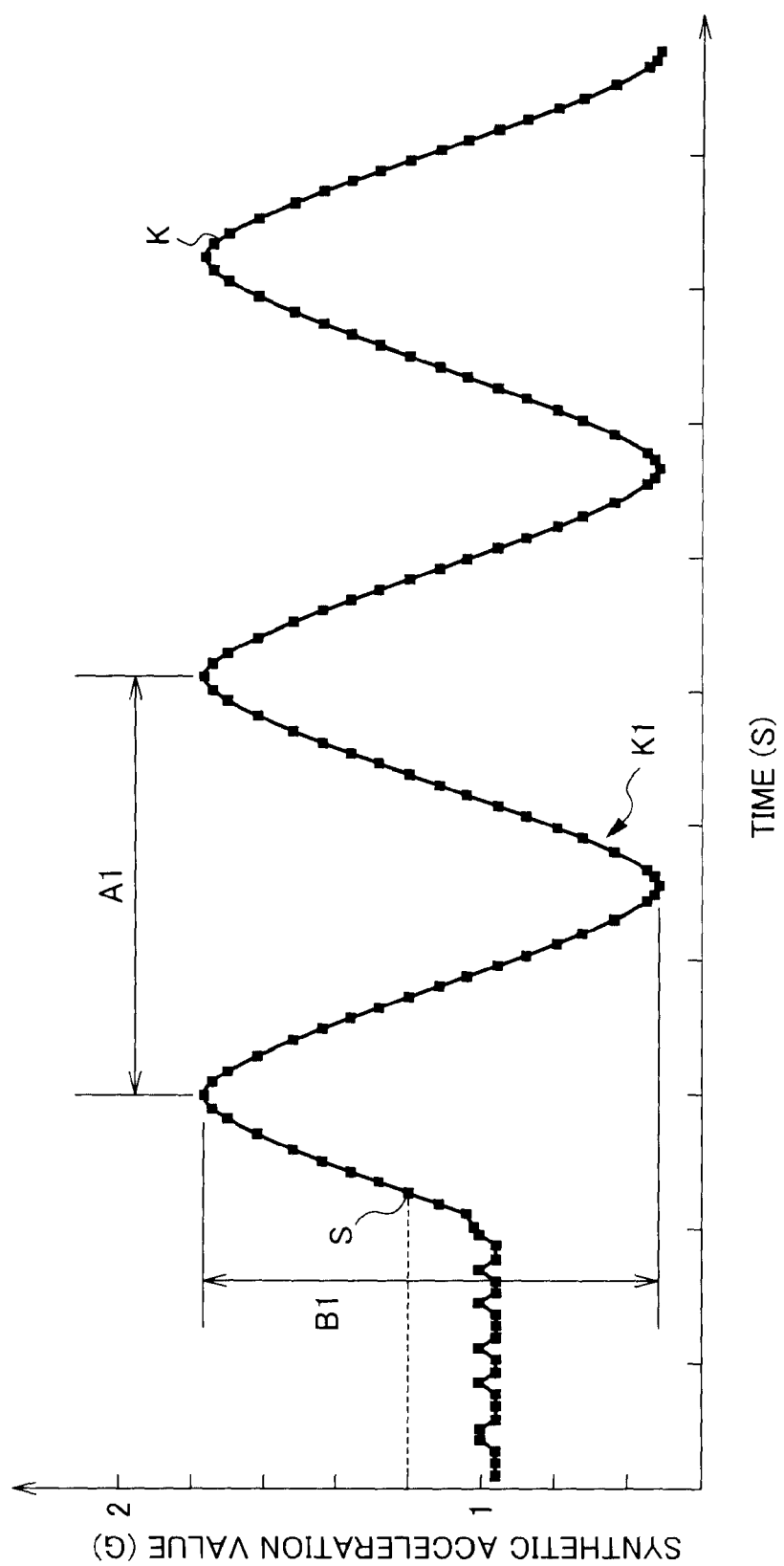
FIG. 11 is a chart showing temporal changes in synthetic acceleration values in a 1B state (walking state).
Figure 12:
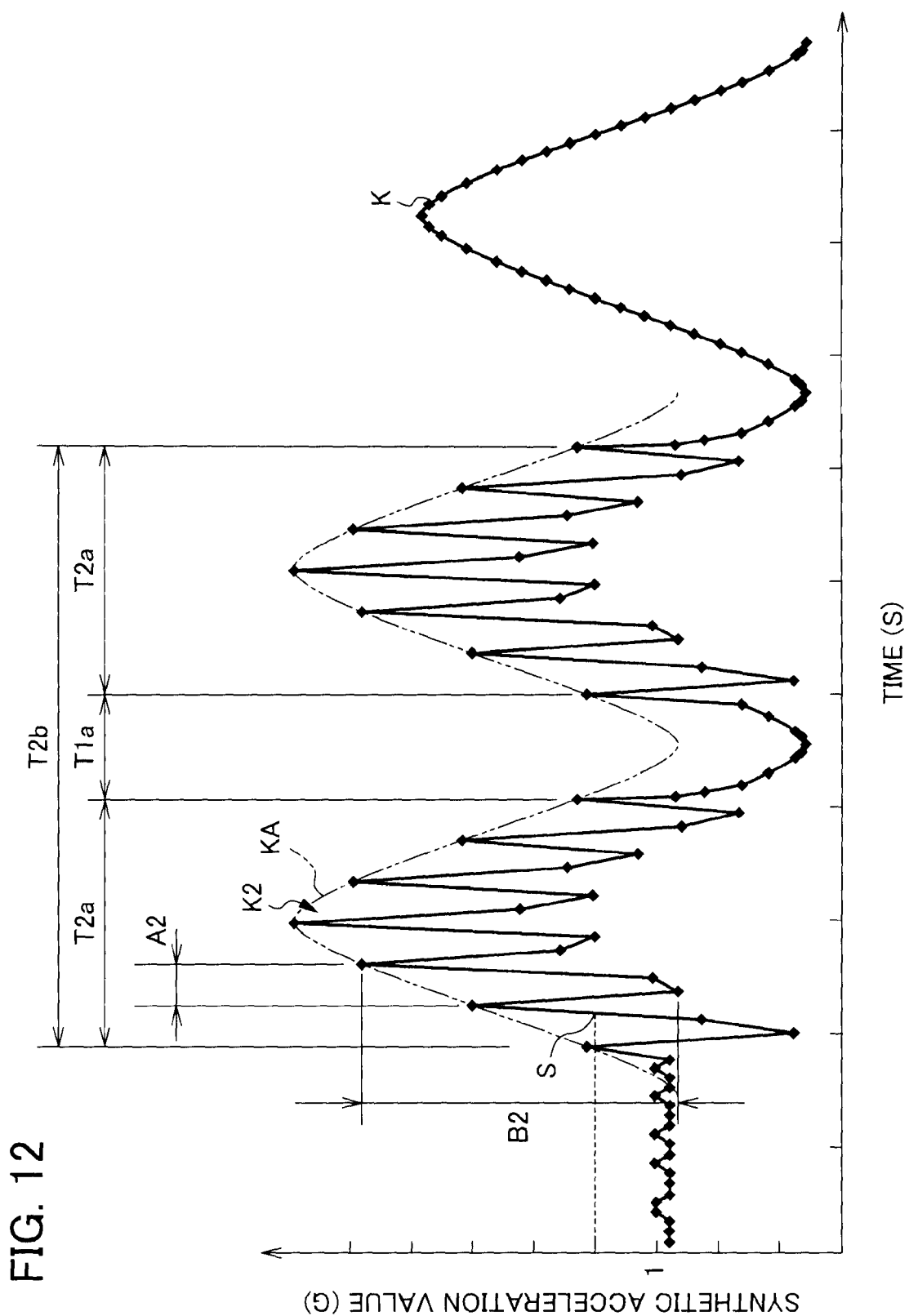
FIG. 12 is a chart showing temporal changes in synthetic acceleration values in a 2B state (walking state+vibration by the vibration producing unit 99).
Figure 13:
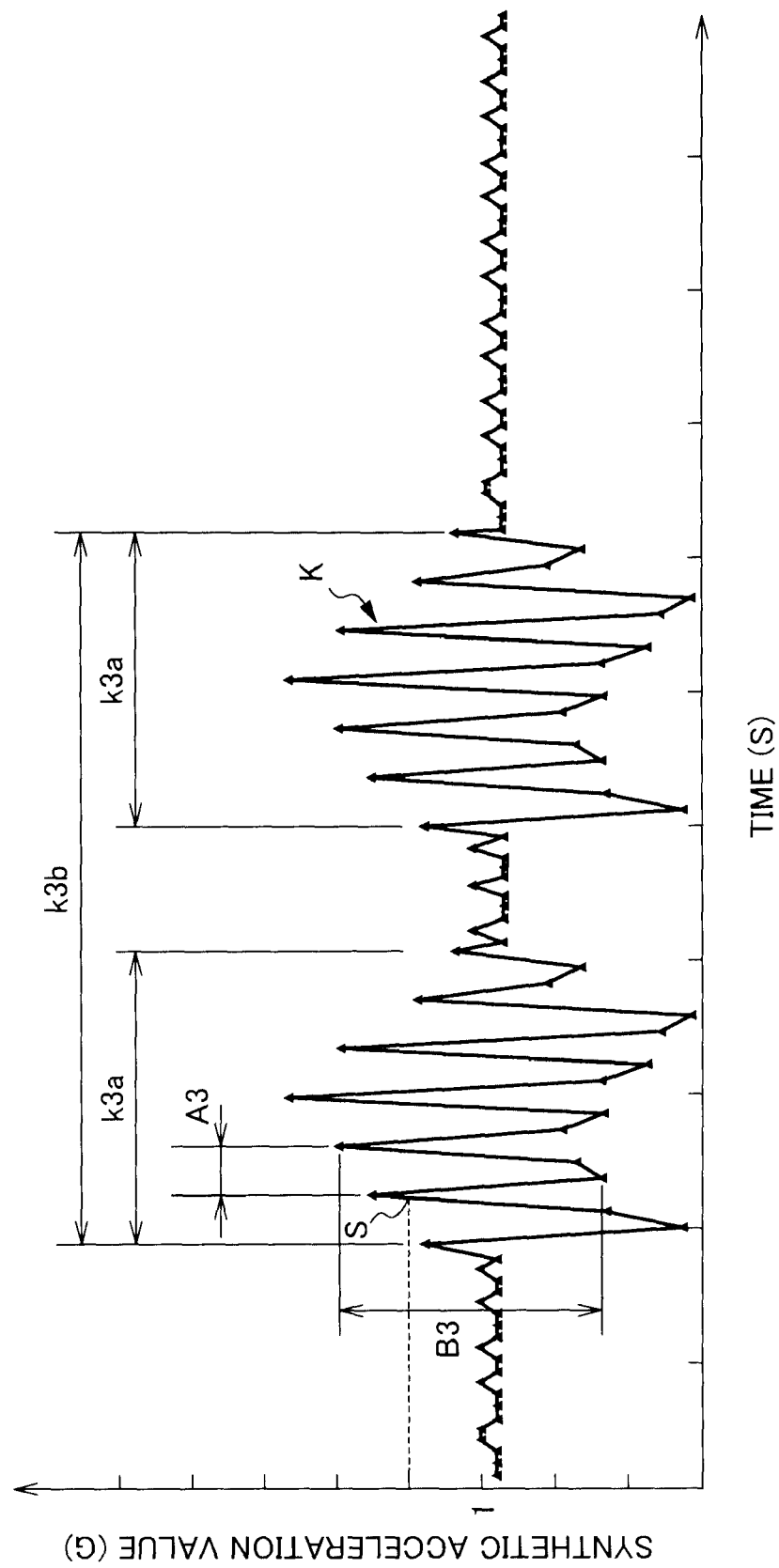
FIG. 13 is a chart showing temporal changes in synthetic acceleration values in a 3B state (only vibration by the vibration producing unit 99).

FIG. 10 is a block diagram illustrating a circuit configuration in the portable phone 1B. FIG. 11 is a chart showing temporal changes in synthetic acceleration values in a 1B state (walking state). FIG. 12 is a chart showing temporal changes in synthetic acceleration values in a 2B state (walking state+vibration by the vibration producing unit 99). FIG. 13 is a chart showing temporal changes in synthetic acceleration values in a 3B state (only vibration by the vibration producing unit 99).

As shown in FIG. 10, the portable phone 1B includes a communication unit 200, a vibration producing unit 99, a three axis acceleration sensor 100, a timer unit 101, a positional information acquisition unit 102, a vibration control unit 105B as a functional unit included in the CPU 45B, a moving velocity calculation unit 107B, a 1B determination unit 111aB, a 2B determination unit 111bB, a 3B determination unit 111cB, a counting unit 112B, a calculation unit 113B, a measurement unit 114B, a presumption unit 115B, an adder unit 116B, and a memory 44B. Here, the portable phone 1B has a pedometer function unit for conducting a pedometer function. The pedometer function unit is configured with the three axis acceleration sensor 100, the timer unit 101, the positional information acquisition unit 102, the vibration control unit 105B as a functional unit included in the CPU 45B, the moving velocity calculation unit 107B, the 1B determination unit 111aB, the 2B determination unit 111bB, the 3B determination unit 111cB, the counting unit 112B, the calculation unit 113B, the measurement unit 114B, the presumption unit 115B, the adder unit 116B, and the memory 44B.

Hereafter, the description will be focused on structures different than that of Embodiment A. As to structures not described below, they have similar structures to that of Embodiment A.

The positional information acquisition unit 102 acquires the positional information showing the position of the manipulation unit side housing 2 (portable phone 1B). The positional information acquisition unit 102 acquires the positional information in the manipulation unit side housing 2 (portable phone 1B) using GPS. Although the positional information acquisition unit 102 may always be started and may be started intermittently at an interval of a predetermined time period, for example, it may be started at an occasion where the acceleration values measured by the three axis acceleration sensor 100 exceed a predetermined value so as to start acquiring positional information. Here, the value that is added the value multiplying the 2B threshold BX by 0.5 to the average of the static state may be set as the predetermined value. The positional information acquired by the positional information acquisition unit 102 is outputted to the CPU 45B that includes the 2B determination unit 111bB.

The memory 44B stores various application programs such as an application program that causes the pedometer function to be performed. In addition, the memory 44B stores information about the waveform pattern of temporal changes in acceleration values, wherein the information is 1B threshold AX information about the oscillation period of the waveform pattern and the 2B threshold BX information about the amplitude of the waveform pattern. Here, although the 2B threshold BX may be 0.4 G (±0.2 G, a static state as the reference), for example, it is not limited to this but can be set as appropriate. In the present embodiment, the memory 44B stores information about the waveform pattern of temporal changes in the synthetic acceleration values obtained by synthesizing the acceleration values in the three axis directions. Here, the memory 44B stores the waveform pattern at each cycle.

In addition, the memory 44B stores a reference walking velocity or a predetermined 1B moving velocity. The reference walking velocity is a generic or user's average walking velocity. The 1B moving velocity is set a velocity that is unable for a walk or a run (including cases of substantial unableness such as when it is unable for a long period of time but is able for a short period of time).

The moving velocity calculation unit 107B calculates the moving velocity of the manipulation unit side housing 2 (portable phone 1B) from the positional information acquired by the positional information acquisition unit 102. The information on the moving velocity calculated by the moving velocity calculation unit 107B is outputted to the 2B determination unit 111bB.

The determination units 111aB, 111bB, and 111cB determine the state of the portable phone 1B based on the acceleration information from the three axis acceleration sensor 100 and the positional information from the positional information acquisition unit 102. In detail, the determination units 111aB, 111bB, and 111cB determines the state of the portable phone 1B based on the information on the detected value waveform pattern which is a waveform pattern of temporal changes in the synthetic acceleration values obtained by synthesizing the acceleration values in the three axis directions from the three axis acceleration sensor 100, and on the moving velocity information calculated with the positional information from the positional information acquisition unit 102.

The 1B determination unit 111aB determines whether the amplitude is greater than or equal to the 2B threshold BX in the detected value waveform pattern which is a pattern of temporal changes in the synthetic acceleration values of the acceleration values detected by the three axis acceleration sensor 100. The 1B determination unit 111aB determines whether the portable phone 1B is not in a static state. Specifically, the 1B determination unit 111aB determines whether the motion of the portable phone 1B is the motion in 1B state which is a walking state, the motion in the 2B state which is a state where the vibration is applied in the walking state by the vibration producing unit 99, or the motion in the 3B state which is a state where the vibration is applied by the vibration producing unit 99.

Specifically, the 1B determination unit 111aB determines whether the amplitude B1 of the detected value waveform pattern K in FIG. 11 is greater than or equal to the 2B threshold BX. In addition, the 1B determination unit 111aB determines whether the amplitude B2 of the detected value waveform pattern K in FIG. 12 is greater than or equal to the 2B threshold BX. In addition, the 1B determination unit 111aB determines whether the amplitude B3 of the detected value waveform pattern K in FIG. 13 is greater than or equal to the 2B threshold BX. Here, in the present embodiment, when the 2B threshold BX is set to 0.4 G, it is determined that the amplitudes of all of B1, B2 and B3 of the detected value waveform pattern K shown in FIG. 11 to FIG. 13 are greater than or equal to the 2B threshold BX, and it is determined that the state of the detected value waveform pattern K shown in FIG. 11 to FIG. 13 is not in a static state.

The 2B determination unit 111bB determines whether it is in a moving state where the manipulation unit side housing 2 (portable phone 1B) is moving based on positional information when the oscillation period is determined as greater than or equal to the 2B threshold BX by the 1B determination unit 111aB. Specifically, the 2B determination unit 111bB determines whether it is in a moving state based on the moving velocity calculated by the moving velocity calculation unit 107B based on positional information. In detail, the 2B determination unit 111bB determines whether the state of the portable phone 1B is a moving state by comparing the reference walking velocity stored in the memory 44B and the calculated moving velocity. The 2B determination unit 111bB determines whether the portable phone 1B is in the 1B state or the 2B state.

Specifically, the 2B determination unit 111bB determines whether it is in a moving state by comparing the reference walking velocity stored in the memory 44B and the moving velocity in the state in FIG. 11 to FIG. 13. In the present embodiment, each state of the detected value waveform pattern K shown in FIG. 11 and FIG. 12 is determined as a moving state, and the state of the detected value waveform pattern K shown in FIG. 13 is determined as a static state.

In addition, when the moving velocity is greater than or equal to the predetermined 1B velocity, the 2B determination unit 111bB determines that the state of the portable phone 1B is not a moving state. Specifically, the 2B determination unit 111bB determines that the state of the portable phone 1B is not a moving state when the moving velocity is greater than or equal to 1B velocity by comparing 1B velocity stored in the memory 44B and the calculated moving velocity. As described above, the 1B velocity is set the velocity that is unable to achieve at a walk or a run. Thereby, since the 2B determination unit 111bB determines that the move by a train or an automobile is not a move by walking, it is possible to avoid counting the vibration produced when riding a train or an automobile as the step(s).

The 3B determination unit 111cB determines whether the oscillation period of the detected value waveform pattern is greater than or equal to the 1B threshold AX when it is determined as a moving state by the 2B determination unit 111bB. Specifically, the 3B determination unit 111cB determines whether the oscillation period of the detected value waveform pattern is greater than or equal to the 1B threshold AX by comparing the 1B threshold AX stored in the memory 44 and the oscillation period of the detected value waveform pattern. That is, the third determination unit 111cB determines whether the portable phone 1B is in the 1B state which is a walking state or in the 2B state where the vibration is applied by the vibration producing unit 99 in a walking state.

Specifically, 3B determination unit 111cB determines whether the oscillation period A1 of the detected value waveform pattern K in FIG. 11 is greater than or equal to the 1B threshold AX. In addition, 3B determination unit 111cB determines whether the oscillation period A2 of the detected value waveform pattern K in FIG. 12 is greater than or equal to the 1B threshold AX. Here, in the present embodiment, as to the 1B threshold AX, the predetermined value between the oscillation period produced by walking and the oscillation period produced by the vibration producing unit 99 is set to the 1B threshold AX. In the present embodiment, the state of the detected value waveform pattern K shown in FIG. 11 is determined as the 1B state and the state of the detected value waveform pattern K shown in FIG. 12 is determined as the 2B state.

Accordingly, the state of the detected value waveform pattern (the 1B detected value waveform pattern K1) shown in FIG. 11 is determined as the 1B state by the 1B determination unit 111aB, the 2B determination unit 111bB, and the 3B determination unit 111cB, the state of the detected value waveform pattern (the 2B detected value waveform pattern K2) shown in FIG. 12 is determined as the 2B state, and the state of the detected value waveform pattern (a 3B detected value waveform pattern K3) shown in FIG. 13 is determined as the 3B state.

The counting unit 112B counts the number of the 1B detected value waveform patterns that are determined as having the oscillation period greater than or equal to the 1B threshold by the 3B determination unit 111cB. For example, when counting the number of the 1B detected value waveform patterns in a continuous waveform pattern, counting unit 112B can also count the number of the 1B detected value waveform patterns by counting the number of local maximum points (local minimum points). Here, the number of the 1B detected value waveform patterns is counted as the number of user's steps.

The calculation unit 113B calculates the number of detections in the 1B detected value waveform pattern in a time period. The number of detections in the 1B detected value waveform pattern in a time period calculated by the calculation unit 113B is outputted to the presumption unit 115B described later.

The measurement unit 114B measures the duration period of the 2B detected value waveform pattern that is determined as having the oscillation period smaller than the above-described 1B threshold AX by the 3B determination unit 111cB amond the detected waveform patterns. The measurement unit 114B measures the duration period of the 2B detected value waveform pattern by utilizing the time information from the timer unit 101. Here, in the present embodiment, although the duration period T2a of the 2B detected value waveform pattern K2 is measured as the duration period, the duration period T2b (T2a+T1a+T2a) in the period when the vibration is applied intermittently may be used as the duration period.

The presumption unit 115B calculates the number of presumed detections of the 1B detected value waveform pattern by multiplying the number of detections in a time period calculated by the calculation unit 113B by the duration period measured by the measurement unit 114B. The number of detections in a time period used in the presumption unit 115B may be the average number of detections in all the time determined as the 1B detected value waveform pattern from the time the user started to walk, and may be the average number of detections immediately before the 2B detected value waveform pattern is produced.

The adder unit 116B adds the number of detections of the 1B detected value waveform patterns calculated (presumed) by the presumption unit 115B to the count number in the counting unit 112B. The adder unit 116B does not change (does not perform the addition) the count number when the second determination unit 111bB determines that the detected value waveform pattern is not a moving state.

The number that the adder unit 116B added the predetermined number of detections is the number of the 1B detected value waveform patterns that the number of detections in the 2B state is complemented. That is, the number that is added the predetermined detection value is the number of user's steps where the number of user's steps in the 2B state is presumed and complemented (corrected).

Next, the operation of the pedometer function unit in the present embodiment will be described with reference to FIG. 14.

Figure 14:
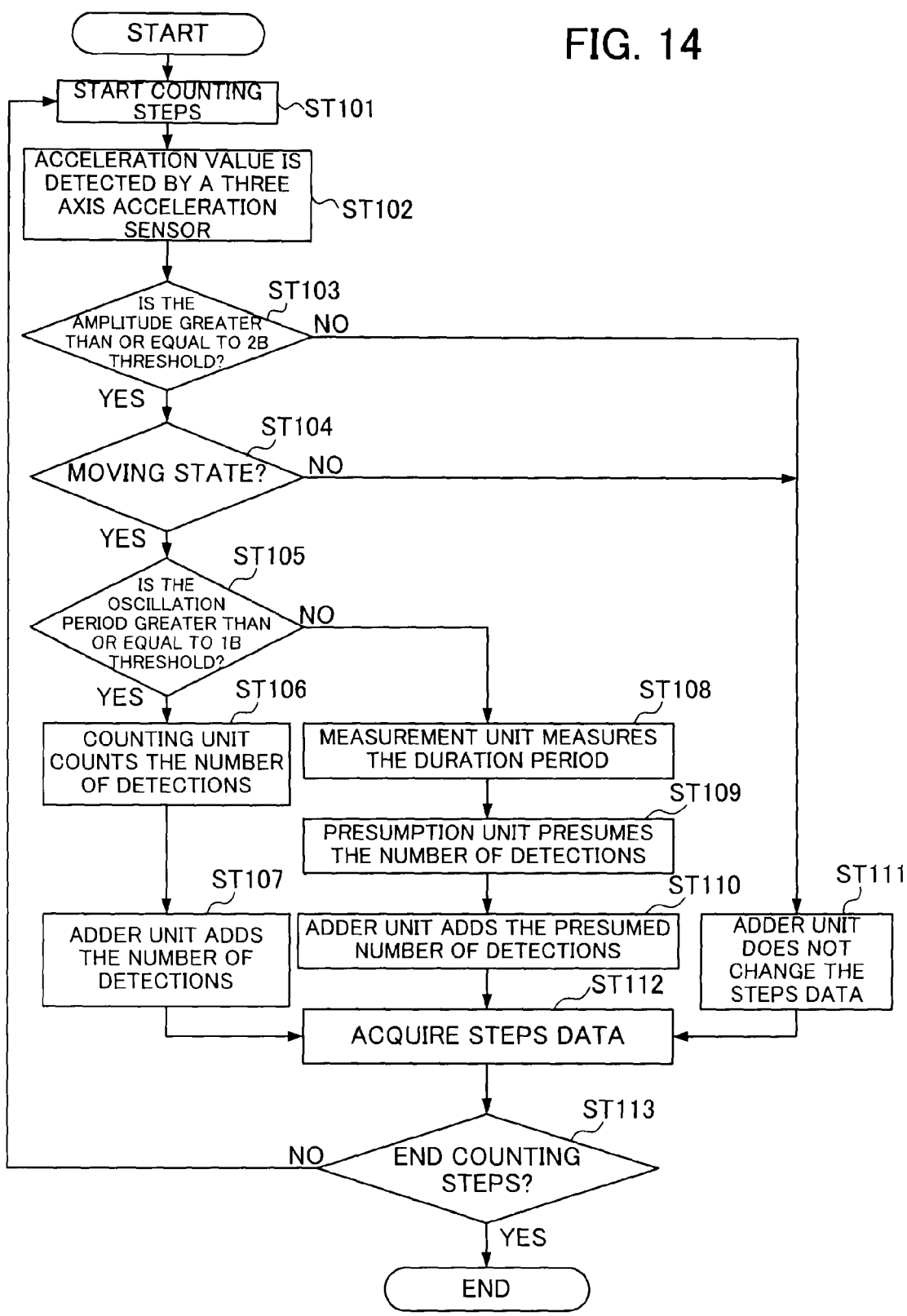
FIG. 14 is a flow chart illustrating an operation in a pedometer function unit.

FIG. 14 is a flow chart illustrating the operation in a pedometer function unit.

First, counting the number of steps is started by way of a predetermined operation (ST101). Thereby, the three axis acceleration sensor 100 measures the acceleration values of the manipulation unit side housing 2 (portable phone 1B) in each of the three axis directions (ST102).

Subsequently, the 1B determination unit 111aB compares the 2B threshold BX stored in the memory 44B and the amplitude in the detected value waveform pattern K, and determines whether the amplitude is greater than or equal to the 2B threshold BX (ST103).

Next, when it is determined that the amplitude is greater than or equal to the 2B threshold BX by the 1B determination unit 111aB (ST103, YES), the 2B determination unit 111bB determines whether the portable phone 1B is in a moving state by comparing the reference walking velocity stored in the memory 44B and the moving velocity calculated by the moving velocity calculation unit 107B (ST104).

Subsequently, if it is determined that the portable phone 1B is in a moving state by the 2B determination unit 111bB (ST104, YES), the 3B determination unit 111cB compares the 1B threshold AX stored in the memory 44B and the oscillation period in the detected value waveform pattern K, and determines whether the oscillation period is greater than or equal to the 1B threshold AX (ST105).

If it is determined that the oscillation period is greater than or equal to the 1B threshold AX by the 3B determination unit 111cB (ST105, YES), the counting unit 112B counts the number of detections of the detected value patterns (1B detection value pattern) (ST106).

Then, the adder unit 116B adds the number of detections counted by the counting unit 112B to the count number that has been counted by then (ST107).

If it is determined that the oscillation period is smaller than the 1B threshold AX by the 3B determination unit 111cB (ST105, NO), the measurement unit 114B measures the duration period of the detected value waveform pattern (2B detected value waveform pattern) (ST108).

In addition, the presumption unit 115B is calculates (presumes) the number of detections of the 1B detected value waveform patterns during the duration period by multiplying the duration period measured by the measurement unit 114B by the number of detections in a time period in the 1B detected value waveform pattern calculated by the calculation unit 113B (ST109).

Then, the adder unit 116B adds the number of presumed detections presumed by the presumption unit 115B to the count number that has been counted by then (ST110).

In addition, if it is determined that the amplitude of the detected value waveform pattern is smaller than the 2B threshold BX by (ST103, NO) and if it is determined as not in a moving state by the 2B determination unit 111bB (ST104, NO), the adder unit 116B does not change the data of the number of steps which is the count number that has been counted by then (ST111).

As described above, by the adder unit 116B, the number of detections or the number of presumed detections is added to the count number that has been counted by then and data of the number of steps is acquired (accumulated) (ST112).

Then, when counting the number of steps is ended by a predetermined operation, counting the number of steps is ended (ST113, YES), and when counting the number of steps is not ended, counting the number of steps is continued (ST113, NO).

According to the present embodiment, it is possible to provide the portable phone 1B having a pedometer function in which the occurrence of a large error in the measured value cause by the vibration produced by a predetermined function is suppressed by using the positional information from the positional information acquisition unit.

In addition, according to the present embodiment, the moving velocity is calculated using the positional information from the positional information acquisition unit, and it is determined whether it is in a walking state based on the calculated moving velocity. Thereby, it is possible to identify the time period to be counted the number of steps correctly.

In addition, according to the present embodiment, since the measured value of the number of steps is complementing with the presumed number of steps based on the average number of detections of the step(s) in the 1B state which is a walking state in the 2B state where the vibration is applied by the vibration producing unit 99 in the walking state of the user, it is possible to provide the portable phone 1B having a high accuracy pedometer function.

In addition, in Embodiment B, although the portable phone 1B determines whether it is in a moving state based on the moving velocity calculated by the moving velocity calculation unit 107B, it is not limited to this. For example, the determination of whether it is in a moving state may be performed based on the moving distance in a predetermined time period. Hereafter, another embodiment corresponding to Embodiment B will be described with reference to FIG. 15. Here, since the overall structure is similar to that of the embodiments described above, the description will be focused on different points mainly.

Figure 15:
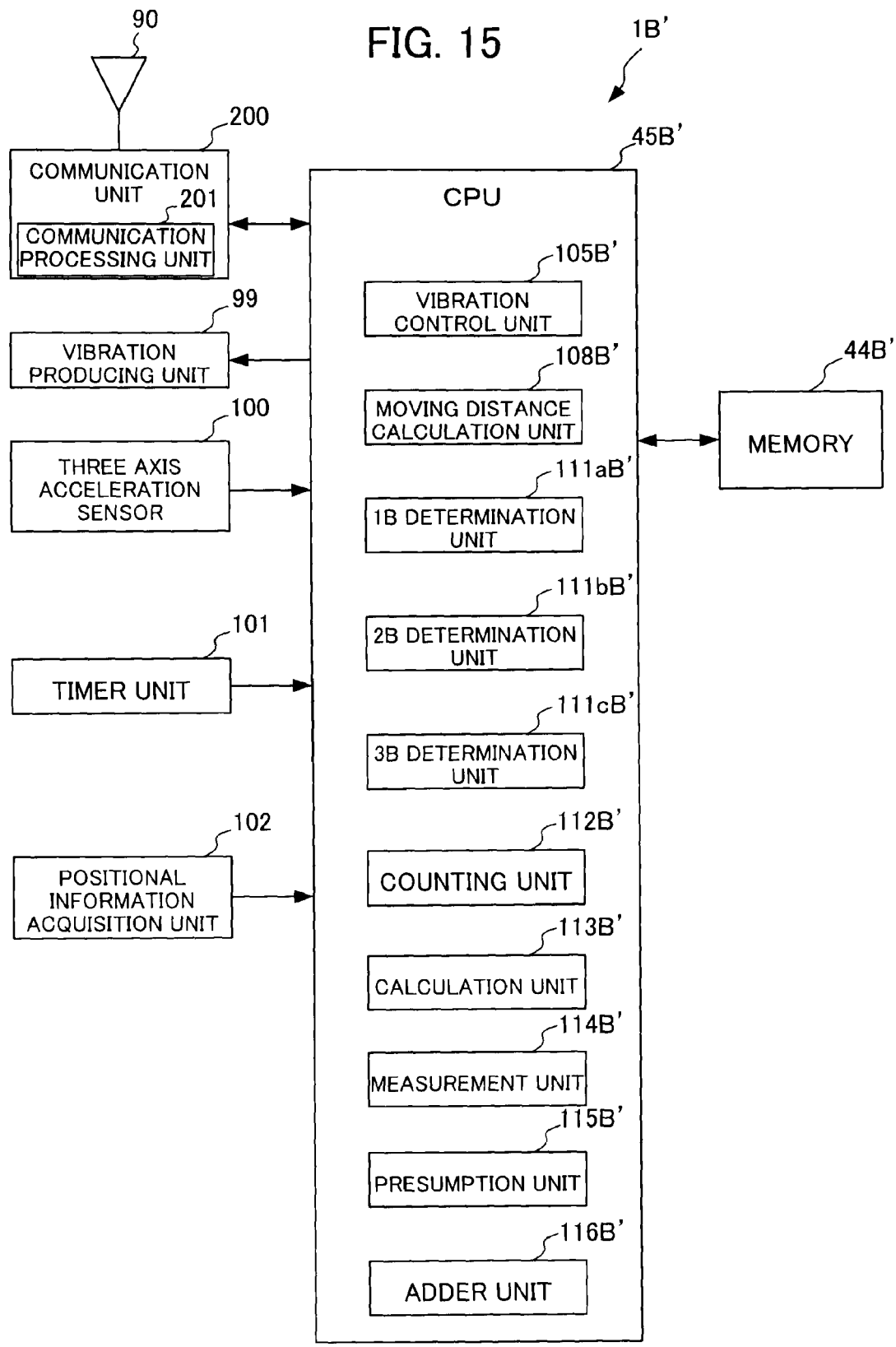
FIG. 15 is a block diagram illustrating a circuit configuration in another embodiment corresponding to Embodiment B.

Specifically, as shown in FIG. 15, the portable phone 1B' in Embodiment B includes a moving distance calculation unit 108B' instead of the moving velocity calculation unit 107B in FIG. 10.

The moving distance calculation unit 108B' calculates the moving distance during a predetermined time period based on positional information from the positional information acquisition unit 102.

Then, the 2B determination unit 111bB' determines whether it is in a moving state based on the moving distance moved during the predetermined time period calculated by the moving distance calculation unit 108B'. Specifically, the 2B determination unit 111bB' determines whether it is in a moving state based on the reference walking distance stored in the memory 44B'.

Here, the reference walking distance can be set a generic walking distance during a predetermined time period or an average walking distance for the user.

In this another embodiment also, as in Embodiment B described above, it is possible to determine whether it is in a moving state. In addition, it is possible to attain similar operations and advantageous effects as the embodiments described above.

Figure 16:
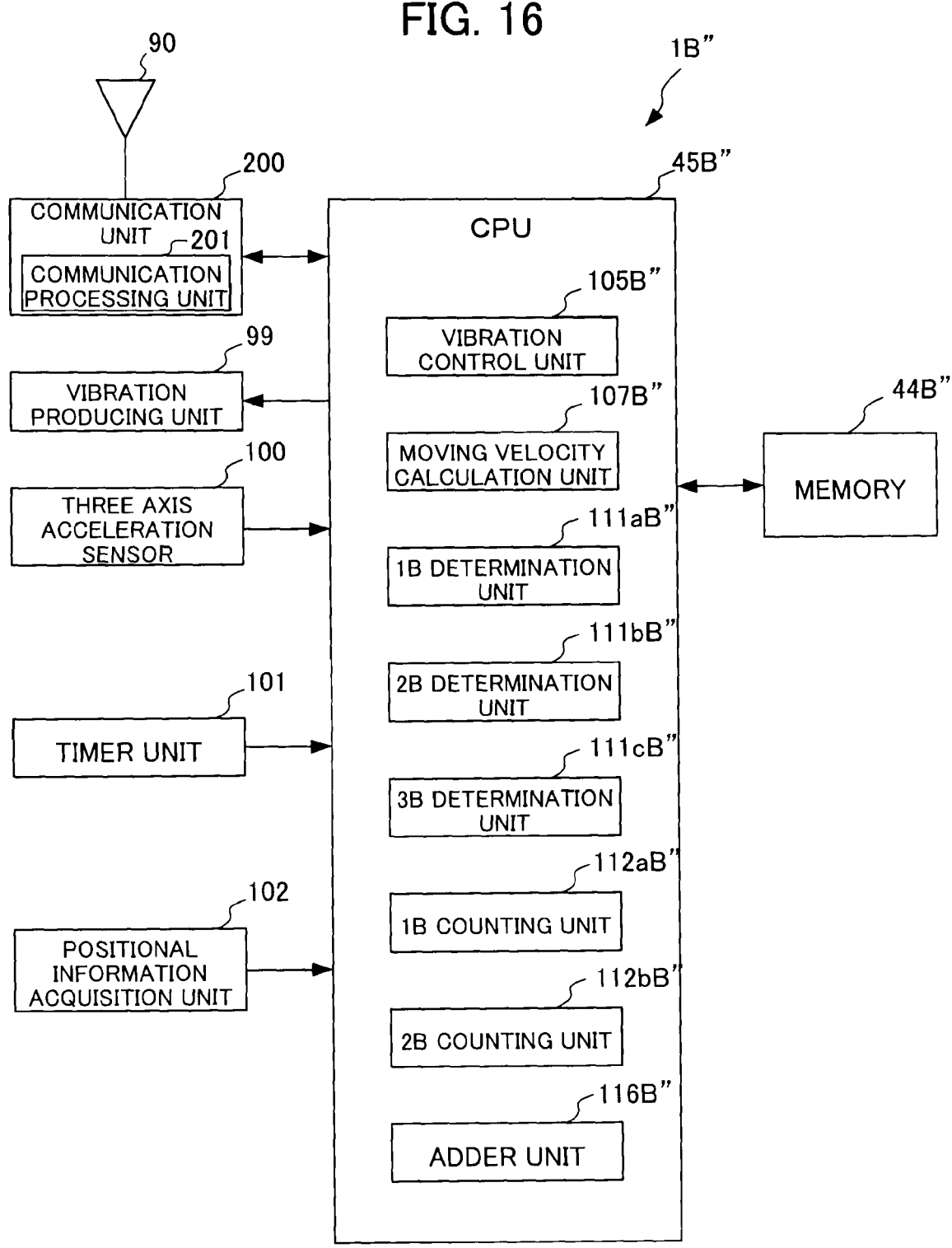
FIG. 16 is a block diagram illustrating a circuit configuration in another embodiment corresponding to Embodiment B.

In addition, in Embodiment B, although the portable phone 1B complements the measured value of the number of steps by presuming the number of detections of the 1B detected value waveform patterns during the duration period of the 2B detected value waveform pattern by the presumption unit 115B, it is not limited to this. For example, the number of detections of the virtual waveform patterns that is made by coupling the top in the 2B detected value waveform pattern adjoining with each other may be detected and the measured value of the number of steps is complemented by the number of detections. Hereafter, an embodiment in this case will be described with reference to FIG. 16. Here, since the overall structure is similar to that of the embodiments described above, the description will be focused on different points mainly. FIG. 16 is a block diagram illustrating a circuit configuration in another embodiment corresponding to the Bth.

As shown in FIG. 16, the portable phone 1B" in the another embodiment includes a communication unit 200, a vibration producing unit 99, a three axis acceleration sensor 100, a timer unit 101, a positional information acquisition unit 102, a vibration control unit 105B" serving as the functional unit included in the CPU 45B", a moving velocity calculation unit 107B", a 1B determination unit 111aB", a 2B determination unit 111bB", a 3B determination unit 111cB", a 1B counting unit 112aB", a 2B counting unit 112bB", an adder unit 11B"6, and a memory 44B".

The 1B counting unit 112aB" counts the number of the 1B detected value waveform patterns that is determined as having the oscillation period greater than or equal to the 1B threshold AX by the 3B determination unit 111cB" among the detected value waveform patterns.

The 2B counting unit 112bB" counts the number of the virtual waveform pattern (refer to FIG. 12 and the virtual waveform pattern KA) that is made by coupling the top adjoining with each other in the 2B detected value waveform pattern that is determined as having the oscillation period smaller than the 1B threshold AX by the 3B determination unit 111cB" among the detected value waveform pattern. It should be noted that as for the virtual waveform pattern, instead of the above, the average sum value of the maximum (top) of the waveform and the minimum that adjoins this may be calculated and adopt the pattern that is made by coupling these average sum values as the virtual waveform pattern.

The adder unit 116B" adds the count number in the 2B counting unit 112bB" to the count number in 1B counting unit 112aB". In addition, in a case when it is determined that the amplitude of the detected value waveform pattern is smaller than the 2B threshold BX by the 1B determination unit 111aB", and in a case when it is determined that it is not in a moving state by the 2B determination unit 111bB", the adder unit 116B" does not change the data of the number of steps that is the count number that has been counted by then.

According to this another embodiment, it is possible to perform the measurement of the number of steps with high accuracy by complementing the measured value of the number of steps. In addition, according to this another embodiment, it is possible to obtain similar advantageous effects to that of the above-described Embodiment B.

Next, Embodiment C will be described.

The circuit configuration of the portable phone 1C will be described with reference to FIG. 17 to FIG. 21.

Figure 17:
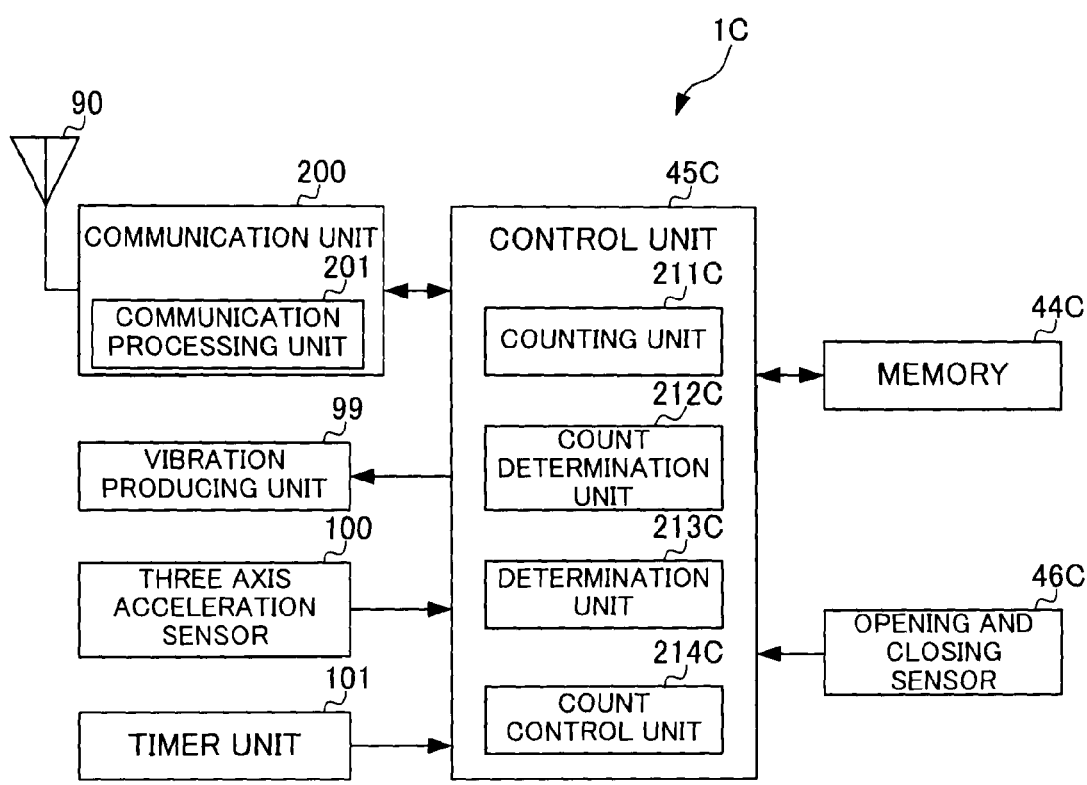
FIG. 17 is a block diagram illustrating a circuit configuration in a portable phone 1C of Embodiment C.
Figure 18:
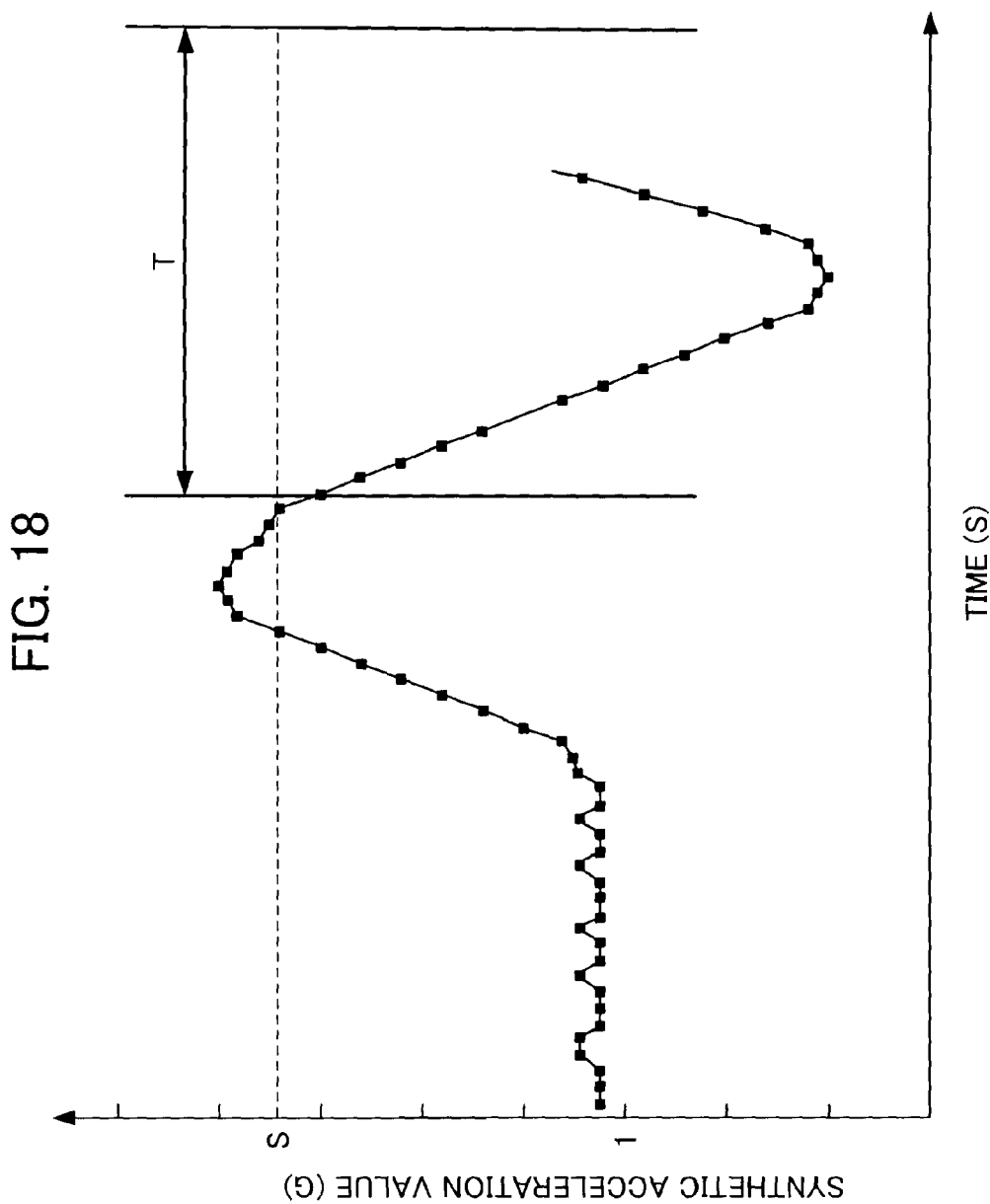
FIG. 18 is a chart showing temporal changes in synthetic acceleration values obtained by synthesizing acceleration detected by an acceleration sensor 100.
Figure 19:
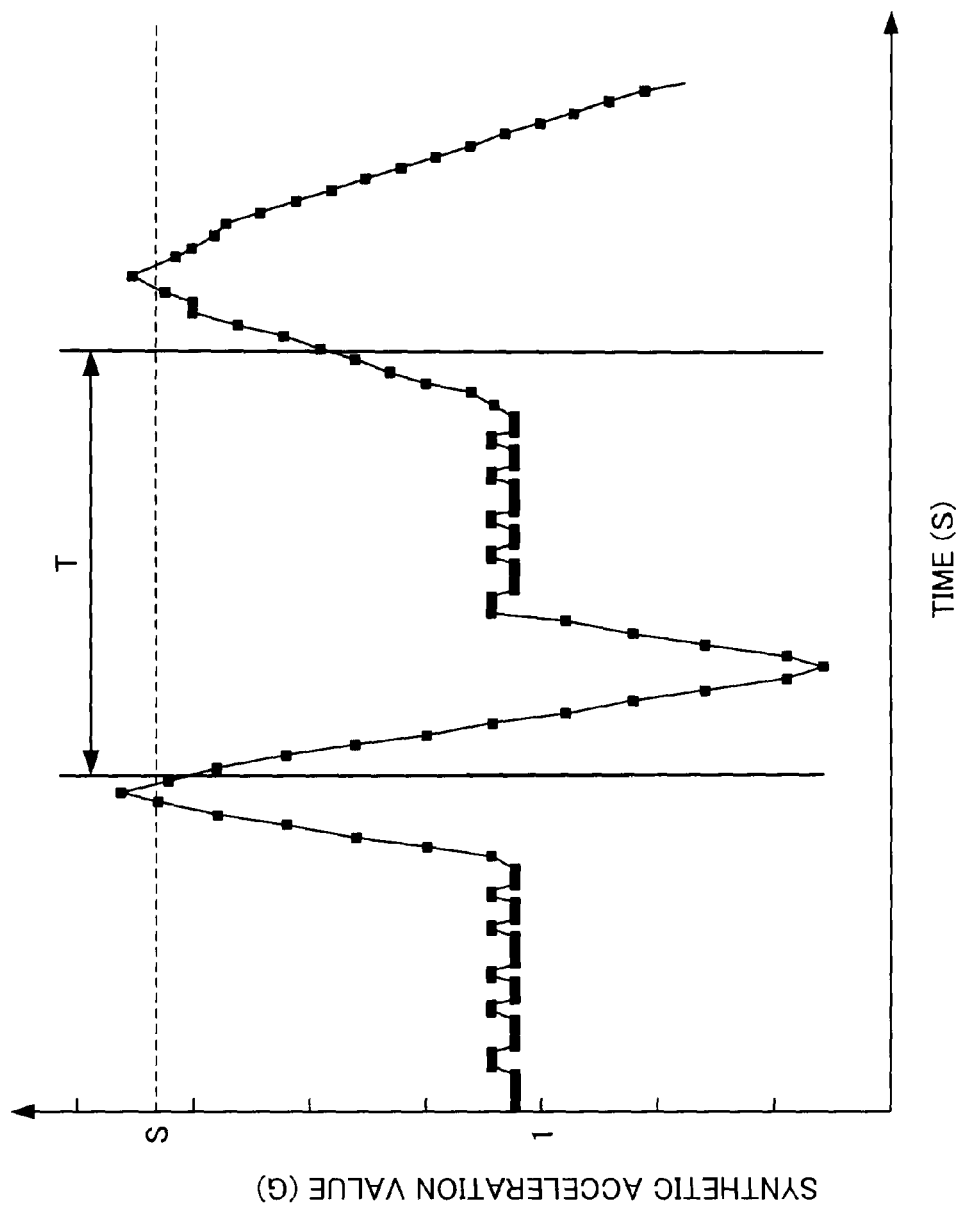
FIG. 19 is a chart showing temporal changes in synthetic acceleration values obtained by synthesizing acceleration detected by the acceleration sensor 100.
Figure 20:
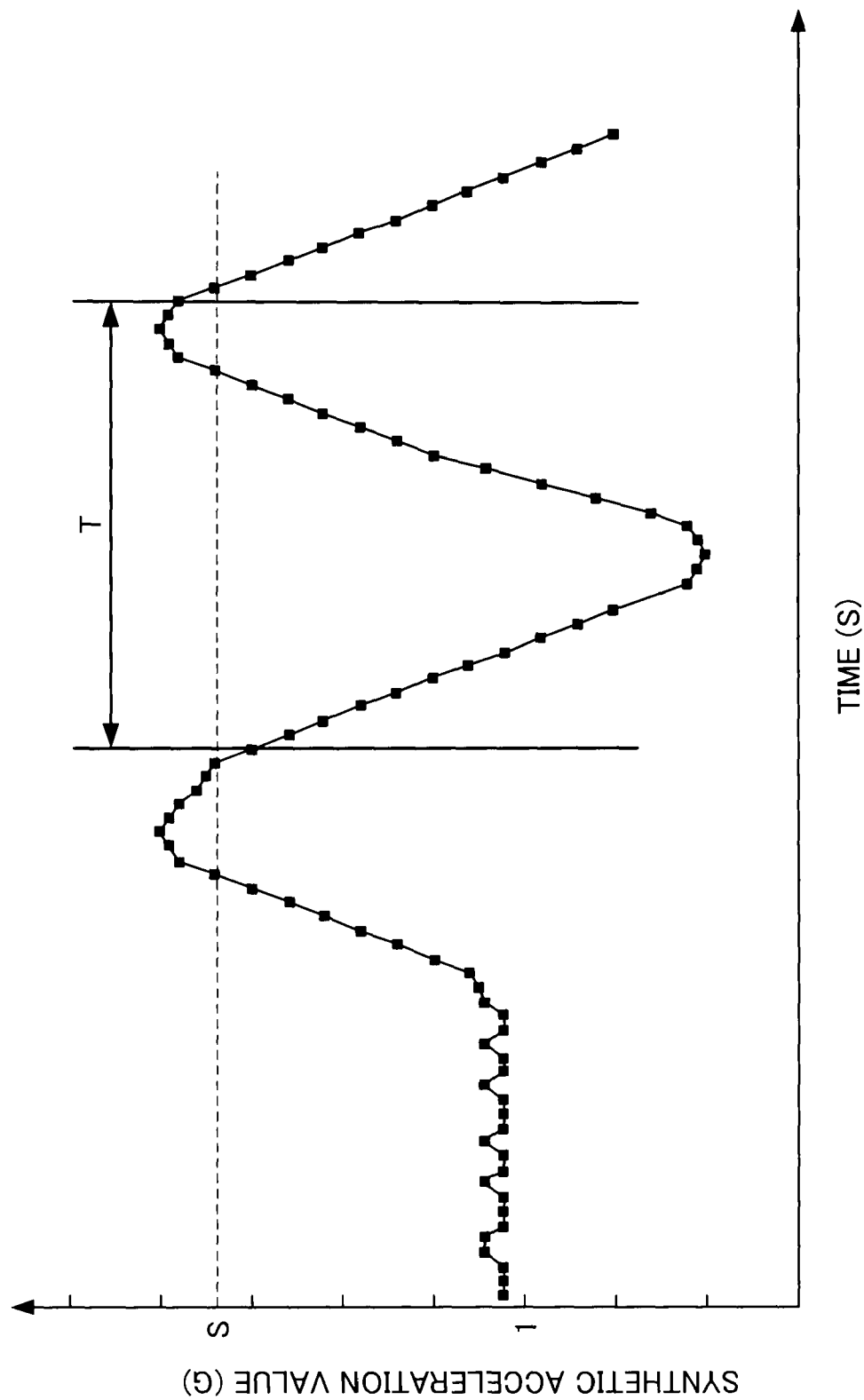
FIG. 20 is a chart showing temporal changes in synthetic acceleration values obtained by synthesizing acceleration detected by the acceleration sensor 100.
Figure 21:
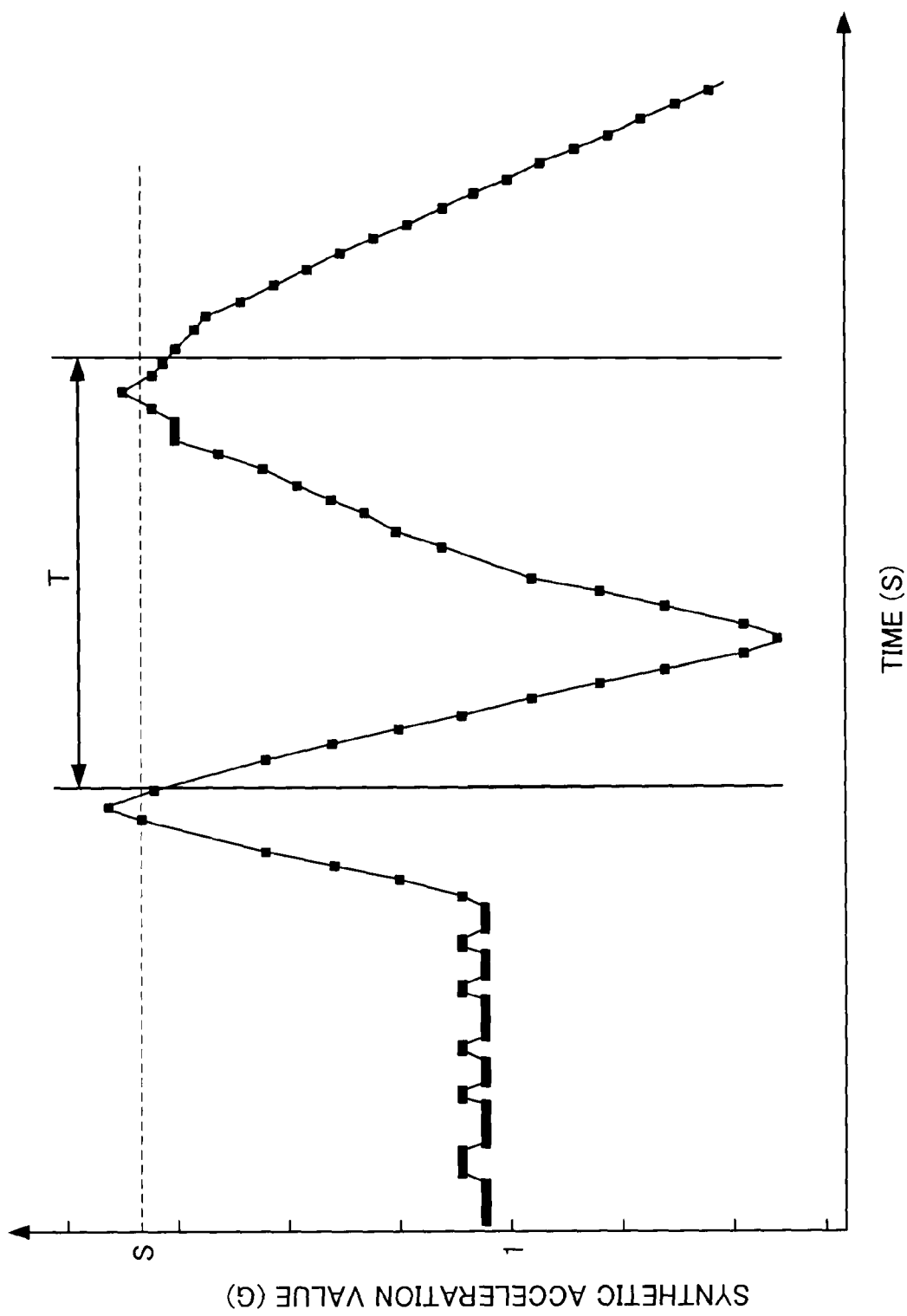
FIG. 21 is a chart showing temporal changes in synthetic acceleration values obtained by synthesizing acceleration detected by the acceleration sensor 100.

FIG. 17 is a block diagram showing the function of the portable phone 1C. FIG. 18 is a chart showing temporal changes in synthetic acceleration values obtained by synthesizing acceleration detected by the acceleration sensor 100. FIG. 19 is a chart showing temporal changes in synthetic acceleration values obtained by synthesizing acceleration detected by the acceleration sensor 100. FIG. 20 is a chart showing temporal changes in synthetic acceleration values obtained by synthesizing acceleration detected by the acceleration sensor 100. FIG. 21 is a chart showing temporal changes in synthetic acceleration values obtained by synthesizing acceleration detected by the acceleration sensor 100.

As shown in FIG. 17, the portable phone 1C includes a communication unit 200, a vibration producing unit 99, an acceleration sensor 100, and a timer unit 101, a memory 44C, a control unit (CPU) 45C, and an opening and closing sensor 46C.

Hereafter, the description will be focused mainly on structures different from Embodiment A or Embodiment B. As to structures not described below, they have similar structures as Embodiment A and Embodiment B.

The control unit 45C is configured using a central processing unit (CPU) or the like, and controls the entire portable phone 1C. The control unit 45C includes a counting unit 211C serving as a functional unit, a count determination unit 212C, a determination unit 213C, and a count control unit 214C.

The opening and closing sensor (opening and closing detection unit) 46C is configured with a magnet 47C (refer to FIG. 1) arranged at the manipulation unit side housing 2, and a Hall device 48C (refer to FIG. 1) arranged at the display unit side housing 3, and detects the opening and closing state of the portable phone 1C. Specifically, the opening and closing sensor 46C detects the strength and weakness of the magnetism accompanying the difference of positional relationship between the manipulation unit side housing 2 and the display unit side housing 3, and determines whether the portable phone 1C is an opened state or a closed state based on the detected result.

The counting unit 211C counts the number of steps based on temporal changes of the acceleration detected by the acceleration sensor 100 in a walking motion. Specifically, it will be described with reference to FIG. 18.

As shown in FIG. 18, the counting unit 211C counts the number of steps considering that it is in a walking motion, when the acceleration value detected by the acceleration sensor 100 is greater than or equal to the threshold S. In addition, during the time period that the state where the detected acceleration is greater than or equal to the threshold S is continuing, the entire acceleration detected in this time period is counted as one step. Thus, the portable phone 1 can count the number of steps of the user who possesses this portable phone 1 one by one.

It should be noted that in the present embodiment, although the counting unit 211C counts the number of steps using processing such as the processing described above, the counting processing for the number of steps is not limited to this and may count the number of steps based on the acceleration values detected by the acceleration sensor 100 using another counting process for the number of steps.

The count determination unit 212C determines whether the step(s) for a first step (fixed number of steps) is calculated by the counting unit 211C from a state where the number of steps has not been counted. The count determination unit 212C determines whether the step(s) for a first step (fixed number of steps) is counted by the counting unit 211C since the count is started (or restarted).

If it is determined that the step(s) for the first step (fixed number of steps) is counted by the count determination unit 212C, the determination unit 213C determines whether or not the step(s) for a second step is counted in a predetermined period T [s] since the step(s) for the first step has been counted. Here, the predetermined period T [s] is checked by the timer unit 101. In addition, it is desirable to set the predetermined period to the time period sufficient to count the step(s) for at least one step.

The count control unit 214C controls the count of the step(s) by the counting unit 211C. In detail, if it is determined that the step(s) for the second step is not counted by the determination unit 213C within a predetermined period T [s], the count control unit 214C controls to cancel the count (fixed number of steps) of the step(s) for the first step. That is, the count control unit 214C instructs the counting unit 211C not to treat the first step as the step(s).

Specifically, it will be described with reference to FIG. 19. FIG. 19 is a chart showing temporal changes in synthetic acceleration values obtained by synthesizing acceleration detected by the acceleration sensor 100 in a case where there is no walking motion of the second step.

As shown in FIG. 19, since the acceleration value detected by the acceleration sensor 100 within the predetermined period T [s] from the time when the step(s) for the first step is counted is smaller than the threshold S, the step(s) for the second step is not counted. Then, since it is determined that the step(s) for the second step is not counted within the predetermined period T [s] after the step(s) for the first step is counted, the determination unit 213C controls to cancel the count of the step(s) for the first step.

Thus, when the step(s) for the second step is not counted within the predetermined period T [s] after the step(s) for the first step is counted, the count control unit 214C cancels the count of the step(s) for the first step by determining that the step(s) for the first step is not caused by a walking motion (it instructs the counting unit 111C not to treat the first step as the step(s)). Therefore, the portable phone 1 can suppress the occurrence of an error in the count of the step(s) caused by the acceleration produced by a different motion from the walking motion.

In addition, if it is determined that the step(s) for the first step is counted by the determination unit 213C, the count control unit 214C controls the counting unit 211C to count the step(s) for the first step and continues the measurement of the number of steps. The count control unit 214C instructs the counting unit 211C to treat the first step as the step(s).

Specifically, it will be described with reference to FIG. 20. FIG. 20 is a chart showing temporal changes in synthetic acceleration values obtained by synthesizing acceleration detected by the acceleration sensor 100 in a case where there is a walking motion of a second step.

As shown in FIG. 20, since the acceleration values detected by the acceleration sensor 100 within the predetermined period T [s] from the step(s) for the first step is counted is greater than or equal to the threshold S, the step(s) for the second step is counted by the counting unit 211C. Then, since it is determined by the determination unit 213C that the step(s) for the second step is counted within the predetermined period T [s] after the step(s) for the first step is counted, the count control unit 214C controls to count the step(s) for the first step.

Thus, when the step(s) for the second step is counted within the predetermined period T [s] after the step(s) for the first step is counted, the count control unit 214C controls to count the step(s) for the first step assuming that both steps are of walking motions (it instructs the counting unit 211C to treat the first step as the step(s)). Therefore, the portable phone 1C can count the number of steps well by identifying the walking motion correctly.

In addition, the count control unit 214C controls the counting unit 211C to continue the count of the number of steps, after controlling the counting unit 211C to count the number of steps for the first step.

Thus, the count control unit 214C controls to continue the count of the number of steps by the pedometer function assuming that the walking motion is continuing when the number of steps for the first step and the second step has been counted. Therefore, the portable phone 1C can count the number of steps by the pedometer function well by identifying the walking motion correctly.

Here, the operation of the count control unit 214C in a case where the manipulation unit side housing 2 and the display unit side housing 3 are opened and closed will be described with reference to FIG. 21.

FIG. 21 is a chart showing temporal changes in synthetic acceleration values obtained by synthesizing acceleration detected by the acceleration sensor 100, in a case where the manipulation unit side housing 2 and the display unit side housing 3 are opened and closed, that is, a case where the manipulation unit side housing 2 and the display unit side housing 3 are brought to an opened state from a closed state, or to an opened state from a closed state).

since the acceleration produced when the manipulation unit side housing 2 and the display unit side housing 3 are opened and closed becomes more than the threshold S as shown in FIG. 21 counting unit 211C counts the number of steps for the first step. Then, since the acceleration produced by the walking motion within the predetermined period T [s] after counting the number of steps for the first step becomes greater than or equal to the threshold S, the counting unit 211C counts the number of steps for the second step. Thus, the counting unit 211C counts the motion when the manipulation unit side housing 2 and the display unit side housing 3 are opened and closed as the number of steps for the first step erroneously.

In order to suppress such errors in the number of steps, the count control unit 214C controls to cancel the count of the number of steps for the first step when the change in the opening and closing state of the manipulation unit side housing 2 and the display unit side housing 3 is detected by the opening and closing sensor 46C within a given period U [s] after the number of steps for the first step is counted by the counting unit 211C, that is, when the manipulation unit side housing 2 and the display unit side housing 3 are made into a closed state from an opened state, or into an opened state from a closed state.

For this reason, the portable phone 1C can suppress the occurrence of an error in the count of the number of steps by way of the acceleration produced when the manipulation unit side housing 2 and the display unit side housing 3 are opened and closed.

Figure 22:
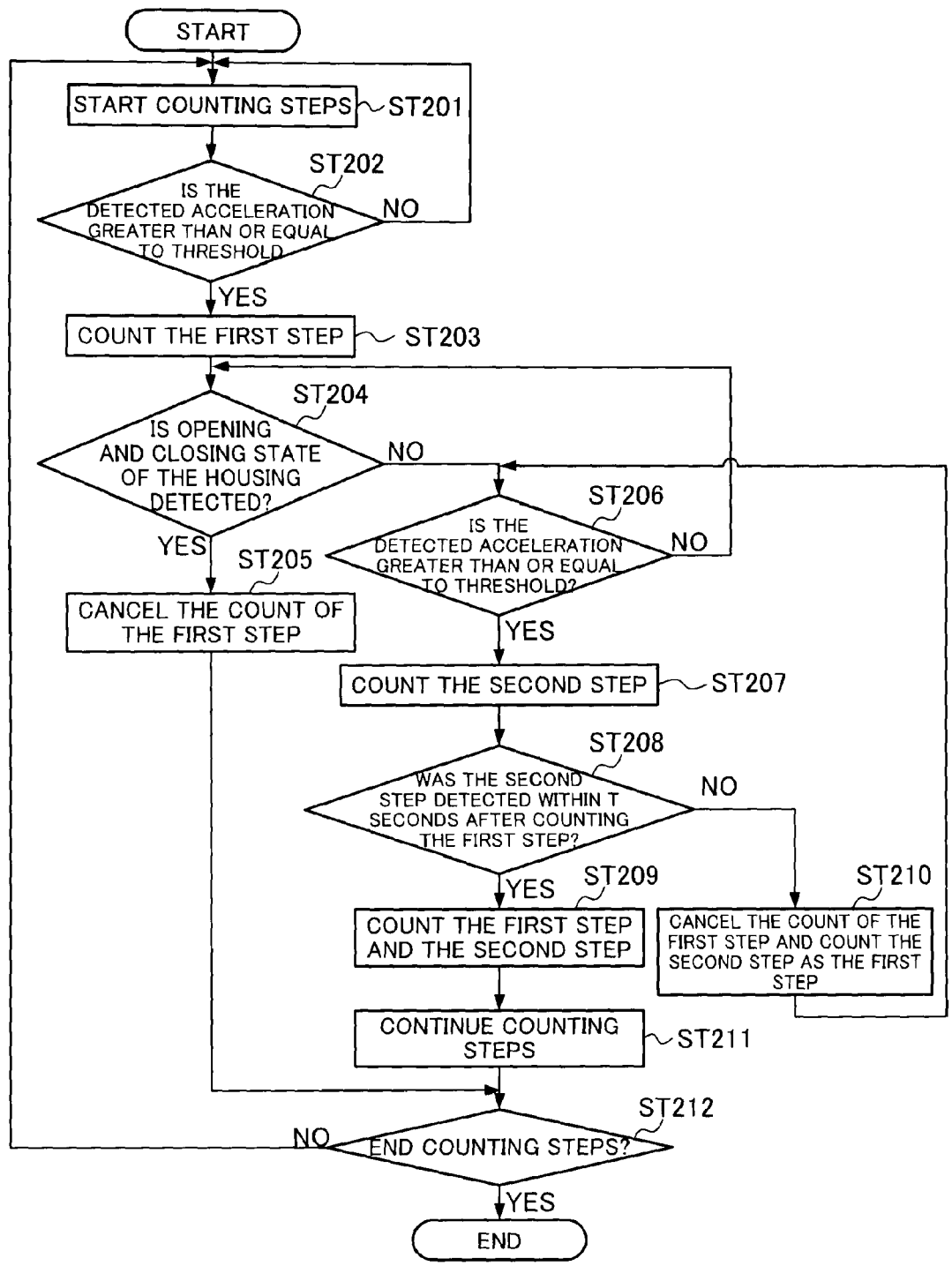
FIG. 22 is a flow chart showing counting processing of the number of steps by a control unit (CPU) 45C.

Next, the flow of processing in the portable phone 1C of the present embodiment will be described. FIG. 22 is a flow chart showing counting processing for the number of steps by the control unit 45C.

In step ST201, the control unit (CPU) 45C resets the number of steps and starts the count of the number of steps.

In step ST202, the counting unit 211C determines whether or not the acceleration detected by the acceleration sensor 100 is greater than or equal to the threshold S. When the acceleration is greater than or equal to the threshold S (Yes), the process moves to step ST203. On the other hand, when the acceleration is smaller than the threshold S (No), the process returns to step ST201.

In step ST203, the count determination unit 212C determines whether or not it is the number of steps for the first step based on the acceleration values detected in step ST202. If it is determined as the number of steps for the first step (Yes), the process moves to step ST4. On the other hand, if it is determined not as the number of steps for the first step (No), the process returns to step ST201.

In step ST204, the counting unit 211C counts the number of steps for the first step, and the process moves to step ST205.

In step ST205, the count control unit 214C determines whether or not the change in the opening and closing state of the manipulation unit side housing 2 and the display unit side housing 3 is detected by the opening and closing sensor 46C. When the change in the opening and closing state is detected (Yes), the process moves to step ST206. On the other hand, when the change of an opening and closing state is not detected (No), the process moves to step ST207.

In step ST206, since the change in the opening and closing state of the manipulation unit side housing 2 and the display unit side housing 3 is detected by the opening and closing sensor 46C in step ST205, the count control unit 214C controls the counting unit 211C so that the number of steps for the first step counted in step ST204 is cancelled.

In step ST207, the counting unit 211C determines whether the acceleration detected by the acceleration sensor 100 is greater than or equal to the threshold S. When the acceleration is greater than or equal to the threshold S (Yes), the process moves to step ST208. On the other hand, when the acceleration is smaller than the threshold S (No), the process returns to step ST205.

In step ST208, the counting unit 211C counts the number of steps for the second step, and the process moves to step ST209.

In step ST209, the determination unit 213C determines whether or not the number of steps for the second step is counted within the predetermined period T [s] after the number of steps for the first step is counted. When the number of steps for the second step is counted within the predetermined period T [s] (Yes), the process moves to step ST210. On the other hand, when the number of steps for the second step is not counted within the predetermined period T [s] (No), the process moves to step ST211.

In step ST210, the counting unit 211C counts the number of steps for the first step and the second step, and the process moves to step ST212.

In step ST211, the count control unit 214C cancels the count of the number of steps for the first step counted in step ST204, and counts the number of steps for the second step counted in step ST208 as the number of steps for the first step.

In step ST212, the count control unit 214C controls the counting unit 111C to continue the count of the number of steps.

In step ST213, the counting unit 211C determines whether to end the count of the number of steps. When ending the count of the number of steps (Yes), the process of this flow chart ends. On the other hand, when not ending the count of the number of steps (No), the process returns to step ST201.

Thus, according to the portable phone 1C of the present embodiment, it is possible to suppress the occurrence of an error in the count of the number of steps caused by the acceleration produced by motions other than the walking motion such as the case where artificial acceleration is added, where the portable phone 1C is opened or closed, and the like.

Here, according to the present embodiment, although the number of steps for the first step is used as the fixed number of steps at the count determination unit 212C, the determination unit 213C, and the count control unit 214C, it is not limited to this, and a plurality of number of steps (e.g., from a first step to a fifth step) may be used as the fixed number of steps.

In addition, in the present embodiment, the portable phone 1C may set one step as the fixed number of steps and may set any of a plurality of number of steps as the fixed number of steps. For example, the fixed number of steps can be set to one to five steps respectively. In this case, it is determined whether a new step(s) is counted in a predetermined time period at every step(s), and when the new step(s) is not counted in the predetermined time period in any one of the step(s), the number of steps (fixed number of steps) that has been measured by then is canceled.

In the above description, although preferred embodiments are described, the present invention can be implemented in various forms, without being limited to the embodiments described above. For example, although the portable phone is described as a portable electronic device in the embodiments described above, it should not be limited to this but may be PHS (registered trademark: Handy Phone System), PDA (Personal Digital Assistant), a portable navigation device, a notebook PC, or the like.

In addition, in the present embodiment, although the foldable portable phone is described using the connection portion 4, it is not limited to this, and may be a sliding type in which one of the housings slides to one direction from a state where the manipulation unit side housing 2 and the display unit side housing 3 are overlapped with each other; a rotating (turning) type in which one of the housings rotates about an axis parallel to the overlapping direction of the manipulation unit side housing 2 and the display unit side housing 3; and a type (straight type) in which the manipulation unit side housing 2 and the display unit side housing 3 are arranged in one housing, and a connection portion is not included. In addition, the portable phone may be a so-called pivotable two axis hinge type which ca be opened and closed, and rotated.

In addition, the invention disclosed in this specification includes a portable electronic device (portable phone) including a housing; an acceleration detection unit housed in the housing; a counting unit that counts a number of steps based on temporal changes in acceleration detected by the acceleration detection unit; and a step counting unit having a correction unit that corrects the number of steps counted by the counting unit.

Here, in Embodiment A, the counting unit is the determination unit 111A and the counting unit 112A, and the correction unit is the calculation unit 113A, the measurement unit 114A, the presumption unit 115A, and the adder unit 116A.

In addition, in another embodiment corresponding to Embodiment A, the counting unit is the timer unit 101, the memory 44A', the 1A determination unit 111aA', the 2A determination unit 111bA', and the 1A counting unit 112aA', and the correction unit is the 2A counting unit 112bA' and the adder unit 116A'.

Moreover, in Embodiment B, the counting unit is the timer unit 101, the positional information acquisition unit 102, the memory 44B, the 1B determination unit 111aB, the 2B determination unit 111bB, the 3B determination unit 111cB, and the counting unit 112B, and the correction unit is the calculation unit 113B, the presumption unit 115B, and the adder unit 116B.

In addition, in another embodiment (former one) corresponding to Embodiment B, the counting unit is the timer unit 101, the positional information acquisition unit 102, the memory 44B', the 1B determination unit 111aB', the 2B determination unit 111bB', the 3B determination unit 111cB', and the counting unit 112B', and the correction unit is the calculation unit 113B', the presumption unit 115B', and the adder unit 116B'.

In addition, in another embodiment (latter one) corresponding to Embodiment B, the counting unit is the timer unit 101, the positional information acquisition unit 102, the memory 44B", and the 1B determination unit 111aB", the 2B determination unit 111bB", the 3B determination unit 111cB", and the 1B counting unit 112aB", and the correction unit is the 2B counting unit 112bB" and the adder unit 1116B".

In addition, in Embodiment C, the counting unit is the counting unit 211C and the correction unit is the count control unit 214C.

The invention claimed is:

1. A portable electronic device comprising:
   a housing containing a vibration producing unit that vibrates the housing, the vibration producing unit comprising a motor with an eccentric weight attached to an output portion of the motor;
   a three-axis acceleration detection unit housed in the housing; and
   a step counting unit, the step counting unit comprising:
      a counting unit that counts a number of steps based on temporal changes in acceleration detected by the acceleration detection unit,
      and a correction unit that corrects the number of steps counted by the counting unit,
      the step counting unit further comprising:
         a timer unit housed in the housing;
         a determination unit that determines whether a waveform pattern detected by the acceleration detection unit is a first waveform pattern, a second waveform pattern, or a third waveform pattern, wherein one of the first waveform pattern or the second waveform pattern represents a waveform pattern of a user walking or running, a other of the first waveform pattern or the second waveform pattern is caused by addition of vibration to walking motion or running motion of the user, and the third waveform pattern is a waveform pattern of temporal changes in acceleration values due to movement of the housing produced by only vibration by the vibration producing unit;
         a waveform pattern counting unit that counts a number of the first waveform patterns; and
         a storage unit that stores information regarding the third waveform pattern;
      the correction unit comprising:
         a calculation unit that calculates a number of detections in a first detected value waveform pattern in a time period;
         a measurement unit that measures a duration period of a second detected value waveform pattern utilizing time information from the timer unit;
         a presumption unit that presumes a number of detections of the first detected value waveform patterns by multiplying the number of detections in a time period calculated by the calculation unit by the duration period measured by the measurement unit; and
         an adder unit that adds the number of detections presumed by the presumption unit to the count number in the waveform pattern counting unit but does not change the count number if the determination unit determines that the detected value waveform pattern is the third waveform pattern.

2. The portable electronic device according to claim 1 wherein
   the storage unit stores the waveform pattern, wherein the other of the first waveform pattern or the second waveform pattern is generated in response to the vibration produced by the vibration producing unit, the vibration produced in response to a predetermined move by the user, and the storage unit stores the other of the first waveform pattern or the second waveform pattern.

3. The portable electronic device according to claim 2, wherein
the determination unit compares a detected value waveform pattern that is a pattern of temporal changes in acceleration values detected by the acceleration detection unit and a waveform pattern stored in the storage unit, and
determines whether the detected value waveform pattern is the first waveform pattern or the second waveform pattern.

4. The portable electronic device according to claim 2, wherein
the storage unit stores amplitude information and oscillation period information in a waveform pattern.

5. The portable electronic device of claim 2, wherein the vibration produced by the vibration producing unit is continuous or intermittent.

6. A portable electronic device comprising:
a housing containing a vibration producing unit that vibrates the housing, the vibration producing unit comprising a motor with an eccentric weight attached to an output portion of the motor;
a three-axis acceleration detection unit housed in the housing;
a step counting unit, the step counting unit comprising:
a counting unit that counts a number of steps based on temporal changes in acceleration detected by the acceleration detection unit; and
a correction unit that corrects the number of steps counted by the counting unit,
the step counting unit further comprising:
a timer unit housed in the housing;
a storage unit that stores information about a waveform pattern of temporal changes in acceleration values, which is information of a first threshold information about an oscillation period of a waveform pattern and a second threshold information about an amplitude of a waveform pattern;
a first determination unit that determines whether a detected value waveform pattern that is a waveform pattern of temporal changes in acceleration values detected by the acceleration detection unit is a first detected value waveform pattern in which the oscillation period is greater than or equal to the first threshold and the amplitude is greater than or equal to the second threshold, wherein the first detected value waveform pattern represents a waveform pattern of a user walking or running;
a second determination unit that determines whether the detected value waveform pattern is a second detected value waveform pattern in which the oscillation period is smaller than the first threshold and the amplitude is greater than or equal to the second threshold, and a virtual waveform pattern calculated from the detected value waveform pattern has substantially identical shape to all or a part of the first detected value waveform pattern, wherein the second detected value waveform pattern represents a waveform pattern caused by addition of other vibration to walking motion or running motion of the user;
a third determination unit that determines whether the detected value waveform pattern is a third detected value waveform pattern in which the oscillation period is smaller than the first threshold and the amplitude is greater than or equal to the second threshold, and the virtual waveform pattern has different shape from the first detected value waveform pattern, wherein the third detected value waveform pattern represents a waveform pattern of temporal changes in acceleration values due to movement of the housing produced by only the vibration by the vibration producing unit; and
a first counting unit that counts a number of the first detected value waveform pattern determined by the first determination unit;
the correction unit comprises comprising:
a second counting unit that counts a number of the virtual waveform patterns in the second detected value waveform pattern determined by the second determination unit; and
an adder unit that adds a count number in the second counting unit to a count number in the first counting unit, but does not change the count number if the third determination unit determined that the detected value waveform pattern is the third detected value waveform pattern.

7. The portable electronic device according to claim 6, wherein
the first determination unit and/or the second determination unit determines whether the virtual waveform pattern is the second detected value waveform pattern that has substantially identical shape to all or a part of the first detected value waveform pattern by comparing the virtual oscillation period and the virtual amplitude of the second detected value waveform pattern, and peaks and troughs of waveforms of the virtual waveform pattern.

8. A portable electronic device comprising:
a housing containing a vibration producing unit that vibrates the housing, the vibration producing unit comprising a motor with an eccentric weight attached to an output portion of the motor;
a three-axis acceleration detection unit housed in the housing;
a step counting unit including a counting unit that counts a number of steps based on temporal changes in acceleration detected by the acceleration detection unit, and a correction unit that corrects the number of steps counted by the counting unit,
the step counting unit further comprising:
a timer unit housed in the housing;
a positional information acquisition unit that is housed in the housing and acquires positional information of the housing, wherein the positional information acquisition unit comprises a GPS function;
a storage unit that stores information about a waveform pattern of temporal changes in acceleration values, which is information of a first threshold information about an oscillating period of the waveform pattern and second threshold information about an amplitude of the waveform pattern;
a first determination unit that determines whether the amplitude is greater than or equal to the second threshold in a detected value waveform pattern that is a waveform pattern of temporal changes in acceleration values detected by the acceleration detection unit;
a second determination unit that determines whether a current state is a moving state when the housing is moving based on the positional information in a case where the amplitude is determined as greater than or equal to the second threshold by the first determination unit;

a third determination unit that determines whether an oscillating period of a detected value waveform pattern is greater than or equal to the first threshold in a case where the second determination unit determined that the current state is the moving state, the oscillation period related to a vibration of the housing; and a first counting unit that counts a number of the first detected value waveform patterns determined as having the oscillation period greater than or equal to the first threshold by the third determination unit among the detected value waveform patterns;

the correction unit comprising:

a calculation unit that calculates a number of detections in the first detected value waveform pattern in a time period;

a measurement unit that measures a duration period of the second detected value waveform pattern determined as having the oscillation period smaller than the first threshold by the third determination unit among the detected value waveform patterns;

a presumption unit that presumes a number of detections of the first detected value waveform patterns by multiplying the duration period measured by the measurement unit by the number of detections in a time period calculated by the calculation unit; and an adder unit that adds the number of detections presumed by the presumption unit to the count number in the first counting unit.

9. The portable electronic device according to claim 8, wherein the adder unit does not change the count number if the second determination unit determines that the housing is not in the moving state.

10. The portable electronic device according to claim 8, further comprising:

a moving distance calculation unit that calculates a moving distance moved during a predetermined time period from the positional information acquired by the positional information acquisition unit, wherein the second determination unit determines whether a current state is the moving state based on the moving distance moved during the predetermined time period calculated by the moving distance calculation unit.

11. The portable electronic device according to claim 8, further comprising:

a moving velocity calculation unit that calculates a moving velocity from the positional information acquired by the positional information acquisition unit, wherein the second determination unit determines whether a current state is the moving state based on the moving velocity calculated by the moving velocity calculation unit.

12. The portable electronic device according to claim 11, wherein the second determination unit determines that the current state is not the moving state, when the moving velocity is greater than or equal to a predetermined first velocity.

13. A portable electronic device comprising:

a housing containing a vibration producing unit that vibrates the housing, the vibration producing unit comprising a motor with an eccentric weight attached to an output portion of the motor;

a three-axis acceleration detection unit housed in the housing;

a step counting unit, the step counting unit comprising:

a counting unit that counts a number of steps based on temporal changes in acceleration detected by the acceleration detection unit, and a correction unit that corrects the number of steps counted by the counting unit, the step counting unit further comprising:

a timer unit housed in the housing;

a positional information acquisition unit that is housed in the housing and acquires positional information of the housing, wherein the positional information acquisition unit comprises a GPS function;

a storage unit that stores information about a waveform pattern of temporal changes in acceleration values, which is information of a first threshold information about an oscillation period of a waveform pattern and second threshold information about an amplitude of a waveform pattern;

a first determination unit that determines that the amplitude is greater than or equal to the second threshold in a detected value waveform pattern that is a waveform pattern of temporal changes in acceleration values detected by the acceleration detection unit;

a second determination unit that determines whether a current state is a moving state where the housing is moving based on the positional information in a case where the first determination unit determined that the amplitude is greater than or equal to the second threshold;

a third determination unit that determines whether an oscillation period of the detected value waveform pattern is greater than or equal to the first threshold in a case where the second determination unit determined that the current state is the moving state, the oscillation period related to a vibration of the housing; and a first counting unit that counts a number of the first detected value waveform patterns determined as having the oscillation period greater than or equal to the first threshold by the third determination unit among the detected value waveform patterns;

the correction unit comprising:

a second counting unit that counts a number of virtual waveform patterns that are made by coupling adjacent top points in the second detected value waveform patterns determined as having the oscillation period smaller than the first threshold among the detected value waveform patterns; and an adder unit that adds the count number in the first counting unit to the count number in the second counting unit.

* * * * *